US006033761A

United States Patent [19]

Dwiggins et al.

[11] Patent Number: 6,033,761

[45] Date of Patent: *Mar. 7, 2000

[54] SOFT, BULKY SINGLE-PLY TISSUE HAVING LOW SIDEDNESS AND METHOD FOR ITS MANUFACTURE

[75] Inventors: John H. Dwiggins, Neenah; Ranga Ramesh, Appleton; Frank D. Harper, Neenah; Anthony O. Awofeso; T. Philips Oriaran, both of Appleton; Galyn A. Schulz, Greenville; Dinesh M. Bhat, Neenah, all of Wis.

[73] Assignee: Fort James Corporation, Deerfield, Ill.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/772,435

[22] Filed: Dec. 23, 1996

[51] Int. Cl.$^7$ .......................... B32B 3/00

[52] U.S. Cl. .......................... 428/172; 428/156; 162/109; 162/112; 162/113; 162/125; 162/127; 162/129; 162/130; 162/147; 162/149; 162/158; 162/164.1; 162/173

[58] Field of Search .......................... 162/110, 111, 162/112, 113, 125, 127, 129, 130, 147, 149, 158, 164.1, 179, 358, 280, 109, 173; 528/230, 245; 510/302, 298, 308, 322, 327–30, 332, 394; 428/172, 156

[56] References Cited

U.S. PATENT DOCUMENTS

| | | | |
|---|---|---|---|
| 5,573,830 | 11/1996 | Schulz | 428/156 |
| 5,656,134 | 8/1997 | Marinak et al. | 162/281 |
| 5,695,607 | 12/1997 | Oriarian et al. | 162/112 |

*Primary Examiner*—Louise N. Leary

[57] ABSTRACT

The present invention relates to a soft, thick, single-ply tissue and to a process for the manufacture of such tissue product having a basis weight of at least about 15 lbs./3,000 square foot ream and having low sidedness, said tissue exhibiting:

a specific total tensile strength of between 40 and 75 grams per 3 inches per pound per 3000 square feet ream, a cross direction specific wet tensile strength of between 2.75 and 7.5 grams per 3 inches per pound per 3000 square feet ream, the ratio of MD tensile to CD tensile of between 1.25 and 2.75, a specific geometric mean tensile stiffness of between 0.5 and 1.2 grams per inch per percent strain per pound per 3000 square feet ream, a friction deviation of less than 0.225, and a sidedness parameter of less than 0.275.

29 Claims, 7 Drawing Sheets

SOFT, BULKY SINGLE-PLY TISSUE HAVING LOW SIDEDNESS AND METHOD FOR ITS MANUFACTURE

BACKGROUND OF THE INVENTION

Through air drying has become the technology of preference for making tissue for many manufacturers who build new tissue machines as, on balance, through air drying ("TAD") offers many economic benefits as compared to the older technique of conventional wet-pressing ("CWP"). With through air drying, it is possible to produce a single ply tissue with good initial softness and bulk as it leaves the tissue machine.

In the older wet pressing method, to produce a premium quality tissue, it has normally been preferred to combine two plies by embossing them together. In this way, the rougher air-side surfaces of each ply may be joined to each other and thereby concealed within the sheet. However, producing two-ply products, even on state of the art CWP machines, lowers paper machine productivity by about 20% as compared to a one-ply product. In addition, there may be a substantial cost penalty involved in the production of two-ply products because the parent rolls of each ply are not always of the same length, and a break in either of the single plies forces the operation to be shut down until it can be remedied. Also, it is not normally economic to convert older CWP tissue machines to TAD. But even though through air drying has often been preferred for new machines, conventional wet pressing is not without its advantages as well. Water may normally be removed from a cellulosic web at lower energy cost by mechanical means such as by overall compaction than by drying using hot air.

What has been needed in the art is a method of making a premium quality single ply tissue using conventional wet pressing having a high bulk and excellent softness attributes. In this way advantages of each technology could be combined so older CWP machines can be used to produce high quality single ply tissue at a cost which is far lower than that associated with producing two-ply tissue.

Among the more significant barriers to production of a single ply CWP tissue have been the generally low softness and thickness and the extreme sidedness of single ply webs. A tissue product's softness can be increased by lowering its strength, as it is known that softness and strength are inversely related. However, a product having very low strength will present difficulties in manufacturing and will be rejected by consumers as it will not hold up in use. Use of premium, low coarseness fibers, such as eucalyptus, and stratification of the furnish so that the premium softness fibers are on the outer layers of the tissue is another way of addressing the low softness of CWP products; however this solution is expensive to apply, both in terms of equipment and ongoing fiber costs. In any case, neither of these schemes addresses the problem of low thickness. TAD processes employing fiber stratification can produce a nice, soft, bulky sheet having adequate strength and good similarity of the surface texture on the front of the sheet as compared to the back. Having the same texture on front and back is considered to be quite desirable in these products or, more precisely, having differing texture is generally considered quite undesirable. Because of the deficiencies mentioned above, many single-ply CWP products currently found in the marketplace are typically low end products. These products often are considered deficient in thickness, softness, and exhibit excessive two sidedness. Accordingly, these products have had rather low consumer acceptance and are typically used in "away from home" applications in which the person buying the tissue is not the user.

We have found that we can produce a soft, high basis weight, high strength CWP tissue with low sidedness by judicious combination of several techniques as described herein. Basically, these techniques fall into four categories: (i) providing a web having a basis weight of at least 15 pounds for each 3,000 square foot ream; (ii) adding to the web a controlled amount of a temporary wet strength agent and softener/debonder; (iii) low angle, high percent crepe, high adhesion creping giving the product low stiffness and a high stretch; and (iv) optionally embossing the tissue. By various combinations of these techniques as described, taught, and exemplified herein, it is possible to almost "dial in" the required degree of softness, strength, and sidedness depending upon the desired goals.

FIELD OF THE INVENTION

The present invention is directed to a soft, strong in use, bulky single ply tissue paper having low sidedness and processes for the manufacture of such tissue.

DESCRIPTION OF BACKGROUND ART

Paper is generally manufactured by suspending cellulosic fiber of appropriate geometric dimensions in an aqueous medium and then removing most of the liquid. The paper derives some of its structural integrity from the mechanical arrangement of the cellulosic fibers in the web, but most by far of the paper's strength is derived from hydrogen bonding which links the cellulosic fibers to one another. With paper intended for use as bathroom tissue, the degree of strength imparted by this inter-fiber bonding, while necessary to the utility of the product, can result in a lack of perceived softness that is inimical to consumer acceptance. One common method of increasing the perceived softness of bathroom tissue is to crepe the paper. Creping is generally effected by fixing the cellulosic web to a Yankee drum thermal drying means with an adhesive/release agent combination and then scraping the web off the Yankee by means of a creping blade. Creping, by breaking a significant number of inter-fiber bonds adds to and increases the perceived softness of resulting bathroom tissue product.

Another method of increasing a web's softness is through the addition of chemical softening and debonding agents. Compounds such as quaternary amines that function as debonding agents are often incorporated into the paper web. These cationic quaternary amines can be added to the initial fibrous slurry from which the paper web is subsequently made. Alternatively, the chemical debonding agent may be sprayed onto the cellulosic web after it is formed but before it is dried.

As was mentioned above, one-ply bathroom tissue generally suffers from the problem of low thickness, lack of softness, and also "sidedness." Sidedness is introduced into the sheet during the manufacturing process. The side of the sheet that was adhered to the Yankee and creped off, i.e., the Yankee side, is generally softer than the "air" side of the sheet. This two-sidedness is seen both in sheets that have been pressed to remove water and in unpressed sheets that have been subjected to vacuum and hot air (through-drying) prior to being adhered to the crepe dryer. The sidedness is present even after treatment with a softener. A premium one-ply tissue should not only have a high overall softness level, but should also exhibit softness of each side approaching the softness of the other.

The most pertinent prior art patents will be discussed but, in our view, none of them can be fairly said to apply to a one-ply tissue of this invention which exhibits high thickness, soft, strong and low sidedness attributes. U.S. Pat. No. 4,447,294, issued to Osborn, III, relates to towels and facial tissue and discloses a process for making a towel or facial tissue product having high wet strength and low dry strength. This reference requires that the wet strength agent be at least partially cured and that a debonding agent be applied to the already-dried web, which further distinguishes that reference from the present invention. Phan et al., in U.S. Pat. No. 5,262,007 discloses towels, napkins, and tissue papers containing a biodegradable softening compound, a temporary wet strength resin, and a wetting agent. The Phan reference requires the use of a wetting agent, presumably to restore the absorbency lost by use of the softening agent. The present invention is unrelated to the Phan reference and does not require use of a wetting agent to achieve a one-ply bathroom tissue having high absorbency. In U.S. Pat. No. 5,164,045, Awofeso et al. disclose a soft, high bulk tissue. However, production of this product requires stratified foam forming and a furnish that contains a substantial amount of anfractuous and mechanical bulking fibers, none of which are necessary to the present invention. European Application 95302013.8 discloses a low sidedness product, but the tissue does not have the high thickness and temporary strength agent of the present invention. In addition, production of this product requires such strategies as fiber and/or chemical stratification that have been found unnecessary to produce the product of the present invention. Dunning et al., U.S. Pat. No. 4,166,001, discloses a double creped three-layered product having a weak middle layer. The Dunning product does not suggest the novel one-ply premium softness soft tissue of this invention and does not contain a temporary wet strength agent. The foregoing prior art references do not disclose or suggest a high-softness, strong one-ply tissue having low sidedness and having a total tensile strength of no more than 75 grams per three inches per pound per ream basis weight, a cross direction wet tensile strength of at least 2.7 grams per three inches per pound per ream of basis weight, a tensile stiffness of less than about 1.1 grams per inch per percent strain per pound per ream basis weight, a GM friction deviation of no more than 0.225 and a sidedness parameter less than 0.275 usually in the range of about 0.180 to about 0.250.

SUMMARY OF THE INVENTION

The novel premium quality high-softness, single-ply tissue having a very low "sidedness" along with excellent softness, coupled with strength is advantageously obtained by using a combination of four processing steps.

Suitably, the premium softness, strong, low sidedness bathroom tissue has been prepared by utilizing techniques falling into four categories: (i) providing a web having basis weight of at least 15 pounds for each 3,000 square foot ream; (ii) adding to the web or to the furnish controlled amounts of a temporary wet strength agent and a softener/debonder; (iii) low angle, high adhesion creping using suitable high strength nitrogen containing organic adhesives and a crepe angle of less than 85 degrees, the relative speeds of the Yankee dryer and reel being controlled to produce a product MD stretch of at least 15%; and (iv) optionally embossing the tissue. The furnish may include a mixture of softwood, hardwood, and recycled fiber. The premium softness and strong single-ply tissue having low sidedness may be suitably obtained from a homogenous former or from two-layer, three-layer, or multi-layer stratified formers.

Further advantages of the invention will be set forth in part in the description which follows. The advantages of the invention may be realized and attained by means of the instrumentalities and combinations particularly pointed out in the appended claims.

To achieve the foregoing advantages and in accordance with the purpose of the invention as embodied and broadly described herein, there is disclosed:

A method of making an high-softness, high-basis weight, single-ply tissue comprising:

(a) providing a fibrous pulp of papermaking fibers;

(b) forming a nascent web from said pulp, wherein said web has a basis weight of at least about 15 lbs./3,000 sq. ft. ream;

(c) including in said web at least about 3 lbs./ton of a temporary wet strength agent and up to 10 lbs./ton of a nitrogen containing softener; optionally a cationic nitrogen containing softener;

(d) dewatering said web;

(e) adhering said web to a Yankee dryer;

(f) creping said web from said Yankee dryer using a creping angle of less than 85 degrees, wherein the relative speeds between said Yankee dryer and the take-up reel is controlled to produce a final product MD stretch of at least about 15%;

(g) optionally calendering said web;

(h) optionally embossing said web; and (i) forming a single-ply web wherein steps (a)–(f) and optionally steps (g) and (h) are controlled to result in a single-ply tissue product having a total tensile strength of no more than 75 grams per three inches per pound per ream basis weight, a cross direction wet tensile strength of at least 2.7 grams per three inches per pound per ream of basis weight, a tensile stiffness of less than about 1.1 grams per inch per percent strain per pound per ream basis weight, a GM friction deviation of no more than 0.225 and a sidedness parameter less than 0.275 usually in the range of about 0.180 to about 0.250.

In one embodiment of this invention, the product may be embossed with a pattern that includes a first set of bosses which resemble stitches, hereinafter referred to as stitch-shaped bosses, and at least one second set of bosses which are referred to as signature bosses. Signature bosses may be made up of any emboss design and are often a design which is related by consumer perception to the particular manufacturer of the tissue.

In another aspect of the present invention, a paper product is embossed with a wavy lattice structure which forms polygonal cells. These polygonal cells may be diamonds, hexagons, octagons, or other readily recognizable shapes. In one preferred embodiment of the present invention, each cell is filled with a signature boss pattern. More preferably, the cells are alternatively filled with at least two different signature emboss patterns.

In another preferred embodiment, one of the signature emboss patterns is made up of concentrically arranged elements. These elements can include like elements for example, a large circle around a smaller circle, or differing elements, for example a larger circle around a smaller heart. In a most preferred embodiment of the present invention, at least one of the signature emboss patterns are concentrically arranged hearts as can be seen in FIG. 7. Again, in a most preferred embodiment, another signature emboss element is a flower.

The one-ply tissue of this invention has higher softness and strength parameters than prior art one-ply tissues and the embossed one-ply tissue product of the present invention has superior attributes than prior art one-ply embossed tissue products. The use of concentrically arranged emboss elements in one of the signature emboss patterns adds to the puffiness effects realized in the appearance of the paper product tissue. The puffiness associated with this arrangement is the result not only of appearance but also of an actual raising of the tissue upward.

BRIEF DESCRIPTION OF THE DRAWINGS

The present invention will become more fully understood from the detailed description given hereinbelow and the accompanying drawings which are given by way of illustration only and thus are not limiting of the present invention.

DETAILED DESCRIPTION OF THE PREFERRED EMBODIMENTS

Figure 1:
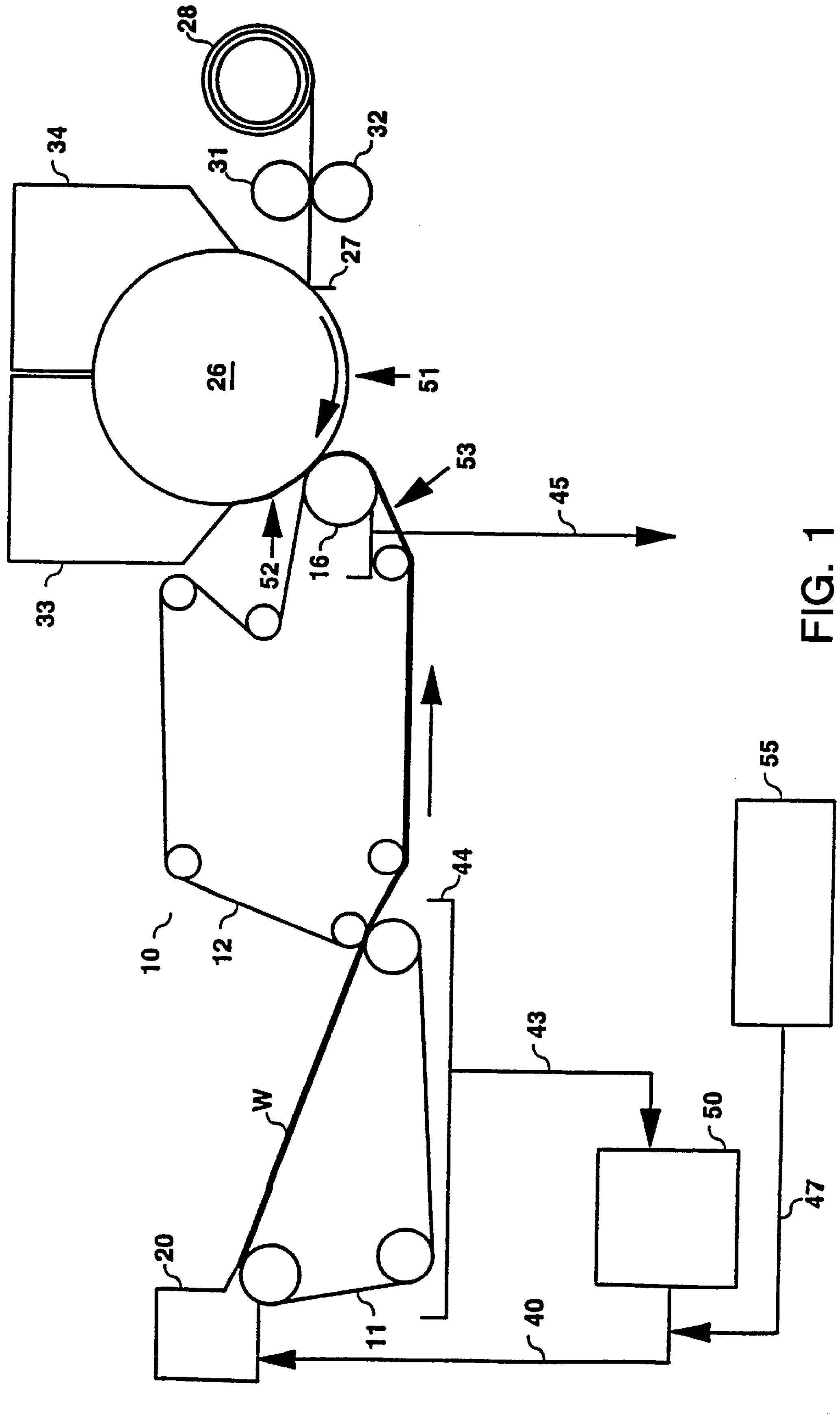
FIG. 1 is a schematic flow diagram of the papermaking process showing suitable points of addition of chargeless temporary wet strength chemical moieties, and optionally, starch and softener/debonder.
Figure 2:
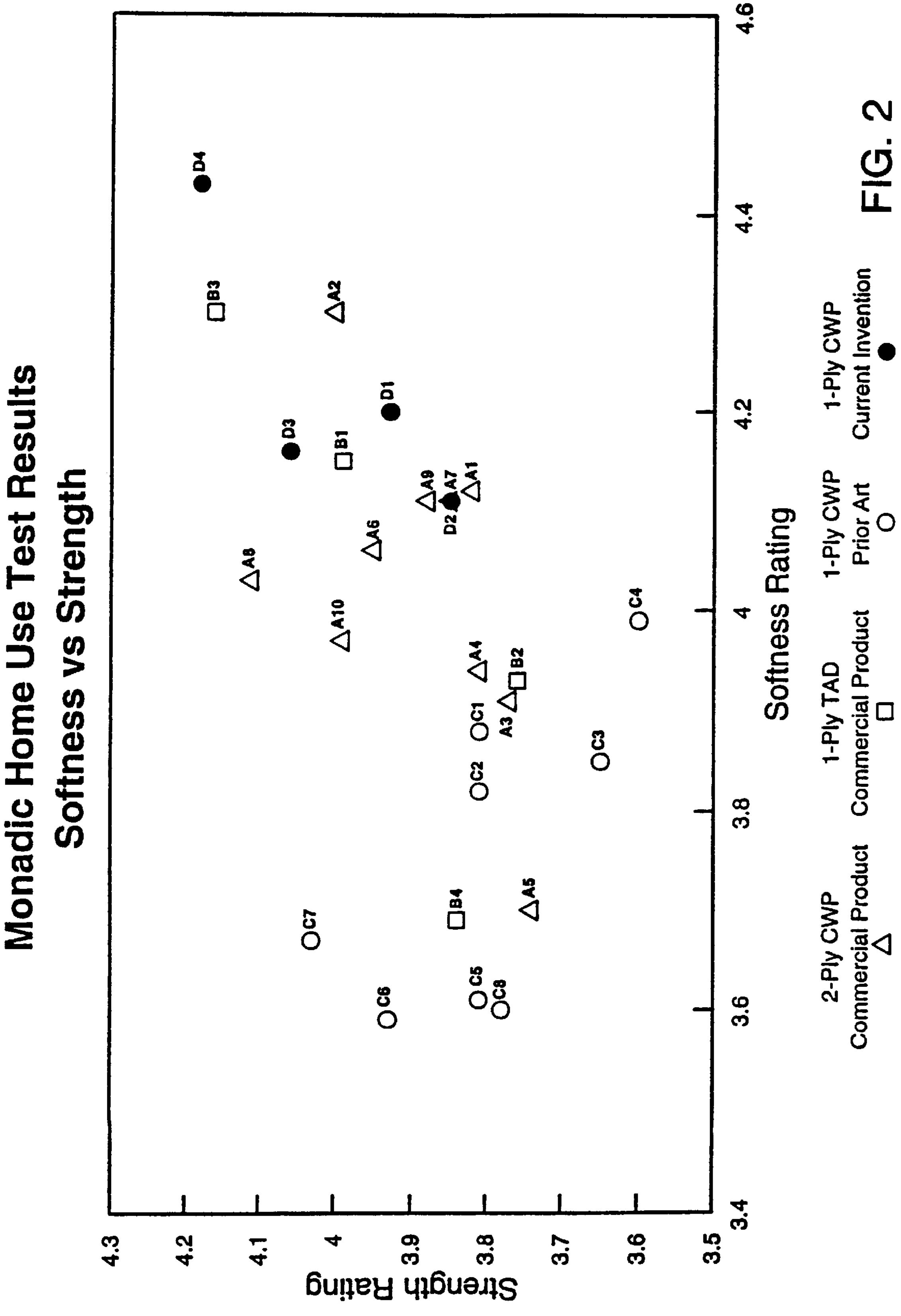
FIG. 2 illustrates the high softness and strength consumer ratings achieved by the one-ply tissue of this invention.

The paper products of the present invention, e.g., single-ply tissue having one, two, three, or more layers, may be manufactured on any papermaking machine of conventional forming configurations such as fourdrinier, twin-wire, suction breast roll, or crescent forming configurations. FIG. 1 illustrates an embodiment of the present invention wherein machine chest (55) is used for preparing the papermaking furnish. Functional chemicals such as dry strength agents, temporary wet strength agents and softening agents may be added to the furnish in the machine chest (55) or in conduit (57). The furnish may be treated sequentially with chemicals having different functionality depending on the character of the fibers that constitute the furnish, particularly their fiber length and coarseness, and depending on the precise balance of properties desired in the final product. The furnish is diluted to a low consistency, typically 0.5% or less, and transported through conduit (40) to headbox (20) of a paper machine (10). FIG. 1 includes a web-forming end or wet end with a liquid permeable foraminous forming fabric (11) which may be of any conventional configuration.

A wet nascent web (W) is formed in the process by ejecting the dilute furnish from headbox (20) onto forming fabric (11). The web is dewatered by drainage through the forming fabric, and additionally by such devices as drainage foils and vacuum devices (not shown). The water that drains through the forming fabric may be collected in savell (44) and returned to the papermaking process through conduit (43) to silo (50), from where it again mixes with the furnish coming from machine chest (55).

From forming fabric (11), the wet web is transferred to felt (12). Additional dewatering of the wet web may be provided prior to thermal drying, typically by employing a nonthermal dewatering means. This nonthermal dewatering is usually accomplished by various means for imparting mechanical compaction to the web, such as vacuum boxes, slot boxes, contacting press rolls, or combinations thereof. The wet nascent web (W) is carried by the felt (12) to the pressing roll (16) where the wet nascent web (W) is transferred to the drum of a Yankee dryer (26). Fluid is pressed from the wet web (W) by pressing roll (16) as the web is transferred to the drum of the Yankee dryer (26) at a fiber consistency of at least about 5% up to about 50%, preferably at least 15% up to about 45%, and more preferably to a fiber consistency of approximately 40%. The web is then dried by contact with the heated Yankee dryer and by impingement of hot air onto the sheet, said hot air being supplied by hoods (33) and (34). The web is then creped from the dryer by means of a creping blade (27). The finished web may be pressed between calender rolls (31) and (32) and is then collected on a take-up roll (28).

Adhesion of the partially dewatered web to the Yankee dryer surface is facilitated by the mechanical compressive action exerted thereon, generally using one or more pressing rolls (16) that form a nip in combination with thermal drying means (26). This brings the web into more uniform contact with the thermal drying surface. The attachment of the web to the Yankee dryer may be assisted and the degree of adhesion between the web and the dryer controlled by application of various creping aids that either promote or inhibit adhesion between the web and the dryer (26). These creping aids are usually applied to the surface of the dryer (26) at position (51), prior to its contacting the web.

Also shown in FIG. 1 are the location for applying functional chemicals to the already-formed cellulosic web. According to one embodiment of the process of the invention, the temporary wet strength agent can be applied directly on the Yankee (26) at position (51) prior to application of the web thereto. In another preferred embodiment, the wet strength agent can be applied from position (52) or (53) on the air-side of the web or on the Yankee side of the web respectively. Softeners are suitably sprayed on the air side of the web from position (52) or on the Yankee side from position (53) as shown in FIG. 1. The softener/debonder can also be added to the furnish prior to its introduction to the headbox (20). Again, when a starch based temporary wet strength agent is added, it should be added to the furnish prior to web formation. The softener may be added either before or after the starch has been added, depending on the balance of softness and strength attributes desired in the final product. In general, charged temporary wet strength agents are added to the furnish prior to its being formed into a web, while uncharged temporary wet strength agents are added to the already formed web as shown in FIG. 1.

Papermaking fibers used to form the soft absorbent, single-ply products of the present invention include cellulosic fibers commonly referred to as wood pulp fibers, liberated in the pulping process from softwood (gymnosperms or coniferous trees) and hardwoods (angiosperms or deciduous trees). Cellulosic fibers from diverse material origins may be used to form the web of the present invention, including non-woody fibers liberated from sugar cane, bagasse, sabai grass, rice straw, banana leaves, paper mulberry (i.e., bast fiber), abaca leaves, pineapple leaves, esparto grass leaves, and fibers from the genus Hesperaloe in the family Agavaceae. Also recycled fibers which may contain any of the above fibers sources in different percentages can be used in the present invention.

Suitable fibers are disclosed in U.S. Pat. Nos. 5,320,710 and 3,620,911, both of which are incorporated herein by reference.

Papermaking fibers can be liberated from their source material by any one of the number of chemical pulping processes familiar to one experienced in the art including sulfate, sulfite, polysulfite, soda pulping, etc. The pulp can be bleached if desired by chemical means including the use of chlorine, chlorine dioxide, oxygen, etc. Furthermore, papermaking fibers can be liberated from source material by any one of a number of mechanical/chemical pulping processes familiar to anyone experienced in the art including mechanical pulping, thermomechanical pulping, and chemi thermomechanical pulping. These mechanical pulps can be bleached, if one wishes, by a number of familiar bleaching schemes including alkaline peroxide and ozone bleaching. The type of furnish is less critical than is the case for prior art products. A significant advantage of our process over the prior art processes is that coarse hardwoods and softwoods and significant amounts of recycled fiber can be utilized to create a soft product in our process while prior art one-ply products had to utilize more expensive low-coarseness softwoods and low-coarseness hardwoods such as eucalyptus.

To reach the attributes needed for a premium tissue product, the tissue of the present invention should be treated with a temporary wet strength agent. It is believed that the inclusion of the temporary wet strength agent allows the product to hold up in use despite its relatively low level of dry strength, which is necessary to achieve the desired high softness level in a CWP one-ply product. Therefore, products having a suitable level of temporary wet strength will generally be perceived as being stronger and thicker in use than will similar products having low wet strength values. Suitable wet strength agents comprise an organic moiety and suitably include water soluble aliphatic dialdehydes or commercially available water soluble organic polymers comprising aldehydic units, and cationic starches containing aldehyde moieties. These agents may be used singly or in combination with each other.

Suitable temporary wet strength agents are aliphatic and aromatic aldehydes including glyoxal, malonic dialdehyde, succinic dialdehyde, glutaraldehyde, dialdehyde starches, polymeric reaction products of monomers or polymers having aldehyde groups and optionally nitrogen groups. Representative nitrogen containing polymers which can suitably be reacted with the aldehyde containing monomers or polymers include vinylamides, acrylamides and related nitrogen containing polymers. These polymers impart a positive charge to the aldehyde containing reaction product.

We have found that condensates prepared from dialdehydes such as glyoxal or cyclic urea and polyol both containing aldehyde moieties are useful for producing temporary wet strength. Since these condensates do not have a charge, they are added to the web as shown in FIG. 1 before or after the pressing roll (16) or charged directly on the Yankee surface. Suitably these temporary wet strength agents are sprayed on the air side of the web prior to drying on the Yankee as shown in FIG. 1 from position 52.

The preparation of cyclic ureas is disclosed in U.S. Pat. No. 4,625,029 herein incorporated by reference in its entirety. Other U.S. Patents of interest disclosing reaction products of dialdehydes with polyols include U.S. Pat. Nos. 4,656,296; 4,547,580; and 4,537,634 and are also incorporated into this application by reference in their entirety. The dialdehyde moieties expressed in the polyols render the whole polyol useful as a temporary wet strength agent in the manufacture of our one-ply tissue. Suitable polyols are reaction products of dialdehydes such as glyoxal with polyols having at least a third hydroxyl group. Glycerin, sorbitol, dextrose, glycerin monoacrylate, and glycerin monomaleic acid ester are representative polyols useful as temporary wet strength agents.

Polysaccharide aldehyde derivatives are suitable for use in the manufacture of our tissues. The polysaccharide aldehydes are disclosed in U.S. Pat. Nos. 4,983,748 and 4,675,394. These patents are incorporated by reference into this application. Suitable polysaccharide aldehydes have the following structure:

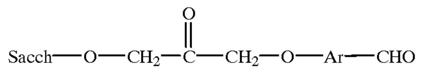

wherein Ar is an aryl group. This cationic starch is a representative cationic moiety suitable for use in the manufacture of the tissue of the present invention and can be charged with the furnish. A starch of this type can also be used without other aldehyde moieties but, in general, should be used in combination with a cationic softener.

Our novel tissue can suitably include polymers having non-nucleophilic water soluble nitrogen heterocyclic moieties in addition to aldehyde moieties. Representative resins of this type are:

A. Temporary wet strength polymers comprising aldehyde groups and having the formula:

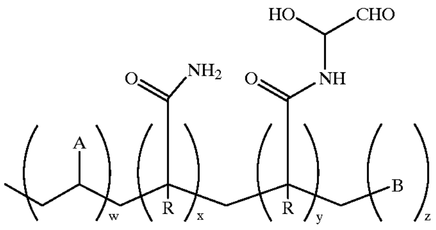

wherein A is a polar, non-nucleophilic unit which does not cause said resin polymer to become water-insoluble; B is a hydrophilic, cationic unit which imparts a positive charge to the resin polymer; each R is H, $C_1$–$C_4$ alkyl or halogen; wherein the mole percent of W is from about 58% to about 95%; the mole percent of X is from about 3% to about 65%; the mole percent of Y is from about 1% to about 20%; and the mole percent from Z is from about 1% to about 10%; said resin polymer having a molecular weight of from about 5,000 to about 200,000.

B. Water soluble cationic temporary wet strength polymers having aldehyde units which have molecular weights of from about 20,000 to about 200,000, and are of the formula:

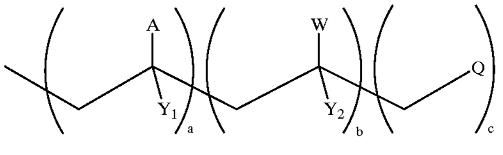

wherein A is

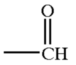

or

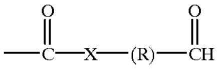

and X is —O—, —NH—, or —$NCH_3$— and R is a substituted or unsubstituted aliphatic group; $Y_1$ and $Y_2$ are independently —H, —$CH_3$, or a halogen, such as Cl or F; W is a nonnucleophilic, water-soluble nitrogen heterocyclic moiety; and Q is a cationic monomeric unit. The mole percent of "a" ranges from about 30% to about 70%, the mole percent of "b" ranges from about 30% to about 70%, and the mole percent of "c" ranges from about 1% to about 40%.

The temporary wet strength resin may be any one of a variety of water soluble organic polymer comprising aldehydic units and cationic units used to increase the dry and wet tensile strength of a paper product. Such resins are described in U.S. Pat. Nos. 4,675,394; 5,240,562; 5,138,002; 5,085,736; 4,981,557; 5,008,344; 4,603,176; 4,983,748; 4,866,151; 4,804,769; and 5,217,576. Among the preferred temporary wet strength resins that may be used in practice of the present invention are modified starches sold under the trademarks Co-Bond® 1000 and Co-Bond® 1000 Plus by National Starch and Chemical Company of Bridgewater, N.J. Prior to use, the cationic aldehydic water soluble polymer is prepared by preheating an aqueous slurry of approximately 5% solids maintained at a temperature of approximately 240° Fahrenheit and a pH of about 2.7 for approximately 3.5 minutes. Finally, the slurry is quenched and diluted by adding water to produce a mixture of approximately 1.0% solids at less than about 130° F.

Co-Bond® 1000 is a commercially available temporary wet strength resin including an aldehydic group on cationic corn waxy hybrid starch. The hypothesized structure of the molecules are set forth as follows:

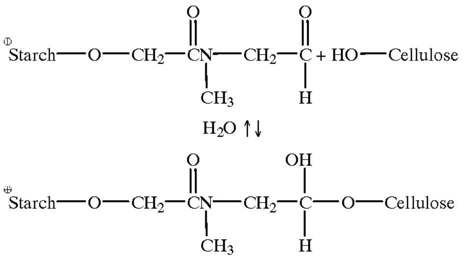

Other preferred temporary wet strength resins, also available from the National Starch and Chemical company are sold under the trademarks Co-Bond® 1600 and Co-Bond® 2500. These starches are supplied as aqueous colloidal dispersions and do not require preheating prior to use.

In addition to the temporary wet strength agent, the one-ply tissue also contains one or more softeners. These softeners are suitably nitrogen containing organic compounds preferably cationic nitrogenous softeners and may be selected from trivalent and tetravalent cationic organic nitrogen compounds incorporating long fatty acid chains; compounds including imidazolines, amino acid salts, linear amine amides, tetravalent or quaternary ammonium salts, or mixtures of the foregoing. Other suitable softeners include the amphoteric softeners which may consist of mixtures of such compounds as lecithin, polyethylene glycol (PEG), castor oil, and lanolin.

The present invention may be used with a particular class of softener materials—amido amine salts derived from partially acid neutralized amines. Such materials are disclosed in U.S. Pat. No. No. 4,720,383; column 3, lines 40–41. Also relevant are the following articles: Evans, *Chemistry and Industry*, Jul. 5, 1969, pp. 893–903; Egan, *J. Am. Oil Chemist's Soc.,* Vol. 55 (1978), pp. 118–121; and Trivedi et al., *J. Am. Oil Chemist's Soc.,* June 1981, pp. 754–756. All of the above are incorporated herein by reference. As indicated therein, softeners are often available commercially only as complex mixtures rather than as single compounds. While this discussion will focus on the predominant species, it should be understood that commercially available mixtures would generally be used to practice.

The softener having a charge, usually cationic softeners, can be supplied to the furnish prior to web formation, applied directly onto the partially dewatered web or may be applied by both methods in combination. Alternatively, the softener may be applied to the completely dried, creped sheet, either on the paper machine or during the converting process. Softeners having no change are applied at the dry end of the papermaking process.

The softener employed for treatment of the furnish is provided at a treatment level that is sufficient to impart a perceptible degree of softness to the paper product but less than an amount that would cause significant runnability and sheet strength problems in the final commercial product. The amount of softener employed, on a 100% active basis, is suitably from about 1.0 pound per ton of furnish up to about 10 pounds per ton of furnish; preferably from about 2 to about 7 pounds per ton of furnish.

Imidazoline-based softeners that are added to the furnish prior to its formation into a web have been found to be particularly effective in producing soft tissue products and constitute a preferred embodiment of this invention. Of particular utility for producing the soft tissue product of this invention are the cold-water dispersible imidazolines. These imidazolines are mixed with alcohols or diols, which render the usually insoluble imidazolines water dispersible. Representative initially water insoluble imidazolines rendered water soluble by the water soluble alcohol or diol treatment include Witco Corporation's Arosurf PA 806 and DPSC 43/13 which are water dispersible versions of tallow and oleic-based imidazolines, respectively.

Treatment of the partially dewatered web with the softener can be accomplished by various means. For instance, the treatment step can comprise spraying, as shown in FIG. 1, applying with a direct contact applicator means, or by employing an applicator felt. It is often preferred to supply the softener to the air side of the web from position 52 shown in FIG. 1, so as to avoid chemical contamination of the paper making process. It has been found in practice that a softener applied to the web from either position 52 or position 53 shown in FIG. 1 penetrates the entire web and uniformly treats it.

Useful softeners for spray application include softeners having the following structure:

$[(RCO)_2EDA]HX$ wherein EDA is a diethylenetriamine residue, R is the residue of a fatty acid having from 12 to 22 carbon atoms, and X is an anion or $[(RCONHCH_2CH_2)_2NR']HX$ wherein R is the residue of a fatty acid having from 12 to 22 carbon atoms, R' is a lower alkyl group, and X is an anion.

More specifically, preferred softeners for application to the partially dewatered web are Quasoft® 218, 202, and 209-JR made by Quaker Chemical Corporation which contain a mixture of linear amine amides and imidazolines.

Another suitable softener is a dialkyl dimethyl fatty quaternary ammonium compound of the following structure:

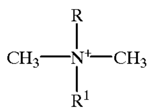

wherein R and $R^1$ are the same or different and are aliphatic hydrocarbons having fourteen to twenty carbon atoms prefereably the hydrocarbons are selected from the following: $C_{16}H_{35}$ and $C_{18}H_{37}$.

A new class of softeners are imidazolines which have a melting point of about 0–40° C. in aliphatic diols, alkoxylated aliphatic diols, or a mixture of aliphatic diols and alkoxylated aliphatic diols. These are useful in the manufacture of the tissues of this invention. The imidazoline moiety in aliphatic polyols, aliphatic diols, alkoxylated aliphatic polyols, alkoxylated aliphatic diols or in a mixture of these compounds, functions as a softener and is dispersible in water at a temperature of about 1° C. to about 40° C. The imidazoline moiety is of the formula:

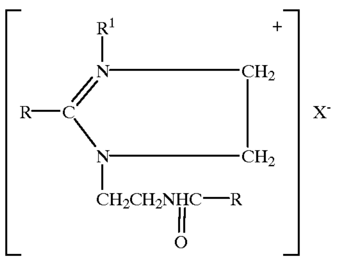

wherein X is an anion and R is selected from the group of saturated and unsaturated parafinic moieties having a carbon chain of $C_{12}$ to $C_{20}$ and $R^1$ is selected from the groups of methyl and ethyl moieties. Suitably the anion is methyl sulfate of the chloride moiety. The preferred carbon chain length is $C_{12}$ to $C_{18}$. The preferred diol is 2,2,4 trimethyl 1,3 pentane diol and the preferred alkoxylated diol is ethoxylated 2,2,4 trimethyl 1,3 pentane diol.

The web is dewatered preferably by an overall compaction process. The web is then preferably adhered to a Yankee dryer. The adhesive is added directly to the metal of the Yankee, and advantageously, it is sprayed directly on the surface of the Yankee dryer drum. Any suitable art recognized adhesive may be used on the Yankee dryer. Suitable adhesives are widely described in the patent literature. A comprehensive but non-exhaustive list includes U.S. Pat. Nos. 5,246,544; 4,304,625; 4,064,213; 4,501,640; 4,528,316; 4,883,564; 4,684,439; 4,886,579; 5,374,334; 5,382,323; 4,094,718; and 5,281,307. Adhesives such as glyoxylated polyacrylamide, and polyaminoamides have been shown to provide high adhesion and are particularly suited for use in manufacture of the one-ply product. The preparation of the polyaminoamide resins is disclosed in U.S. Pat. No. 3,761,354 which is incorporated herein by reference. The preparation of polyacrylamide adhesives is disclosed in U.S. Pat. No. 4,217,425 which is incorporated herein by reference. Typical release agents can be used in accordance with the present invention; however, the amount of release, should one be used at all, will often be below traditional levels.

The web is then creped from the Yankee dryer and calendered. It is necessary that the product of the present invention have a relatively high machine direction stretch. The final product's machine direction stretch should be at least about 15%, preferably at least about 18%. Usually the products machine direction stretch is controlled by fixing the % crepe. The relative speeds between the Yankee dryer and the reel are controlled such that a reel crepe of at least about 18%, more preferably 20%, and most preferably 23% is maintained. Creping is preferably carried out at a creping angle of from about 65 to about 85 degrees, preferably about 70 to about 80 degrees, and more preferably about 75 degrees. The creping angle is defined as the angle formed between the surface of the creping blade's edge and a line tangent to the Yankee dryer at the point at which the creping blade contacts the dryer.

Optionally to obtain maximum softness of the one-ply tissue, the web is embossed. The web may be embossed with any art recognized embossing pattern, including, but not limited to, overall emboss patterns, spot emboss patterns, micro emboss patterns, which are patterns made of regularly shaped (usually elongate) elements whose long dimension is 0.050 inches or less, or combinations of overall, spot, and micro emboss patterns.

In one embodiment of the present invention, the emboss pattern of the one-ply product may include a first set of bosses which resemble stitches, hereinafter referred to as stitch-shaped bosses, and at least one second set of bosses which are referred to as signature bosses. Signature bosses may be made up of any emboss design and are often a design which is related by consumer perception to the particular manufacturer of the tissue.

In another aspect of the present invention, a paper product is embossed with a wavy lattice structure which forms polygonal cells. These polygonal cells may be diamonds, hexagons, octagons, or other readily recognizable shapes. In one preferred embodiment of the present invention, each cell is filled with a signature boss pattern. More preferably, the cells are alternatively filled with at least two different signature emboss patterns.

Figure 7:
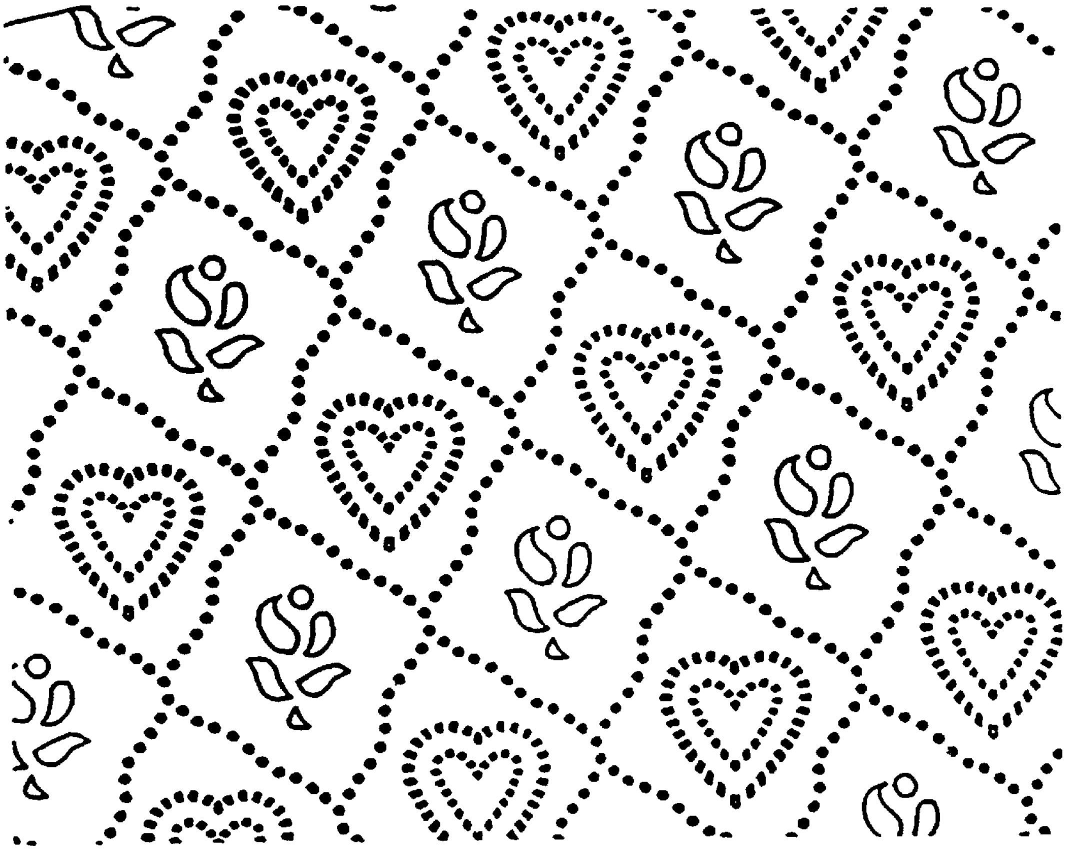
FIG. 7 illustrates the preferred double heart emboss pattern.

In another preferred embodiment, one of the signature emboss patterns is made up of concentrically arranged elements. These elements can include like elements for example, a large circle around a smaller circle, or differing elements, for example a larger circle around a smaller heart. In a most preferred embodiment of the present invention, at least one of the signature emboss patterns are concentrically arranged hearts as can be seen in FIG. 7. The use of concentrically arranged emboss elements in one of the signature emboss patterns adds to the puffiness effects realized in the appearance of the paper product tissue. The puffiness associated with this arrangement is the result not only of appearance but also of an actual raising of the tissue upward. Again, in a most preferred embodiment, another signature emboss element is a flower.

In one embodiment of the present invention, emboss elements are formed having the uppermost portions thereof formed into crenels and merlons, herein after referred to as "crenulated emboss elements." By analogy, the side of such an emboss element would resemble the top of a castle wall having spaced projections which are merlons and depressions there between which are crenels. In a preferred embodiment, at least one of the signature emboss patterns is formed of crenulated emboss elements. More preferably, the signature boss pattern is two concentrically arranged hearts, one or both of which is crenulated.

In a preferred embodiment of the present invention, the signature bosses have a height of between 10 thousandths and 90 thousandths of an inch. The crenels are preferably at a depth of at least 3 thousandths of an inch. It is understood that the use of merlons which are unequally spaced or which differ in height are embraced within the present invention.

According to the present invention, when the web or sheets are formed into a roll, the tissue is aligned so that the bosses are internal to the roll and the debossed side of the tissue is exposed. In the present invention, the boss pattern is offset from the machine direction in the cross direction, the machine direction being parallel to the free edge of the web, by more than 10° to less than 170°.

In one embodiment of the present invention, the boss pattern combines stitch-shaped bosses with a first signature boss made up of linear continuous embossments and a second signature boss pattern made up of crenulated embossments. The overall arrangement of the pattern is selected so that when the sheets are formed into a roll, the signature bosses fully overlap at a maximum of three locations in the roll, more preferably at least two locations, the outermost of these being at least a predetermined distance, e.g., about an eighth of an inch, inward from the exterior surface of the roll. Moreover, the overall average boss density is substantially uniform in the machine direction of each strip in the roll. The combined effect of this arrangement is that the rolls possess very good roll structure and very high bulk.

The signature bosses are substantially centrally disposed in the cells formed by the intersecting flowing lines and serve to greatly enhance the bulk of the tissue while also enhancing the distortion of the surface thereof. At least some of the signature bosses are continuous rather than stitch-shaped and can preferably be elongate. Other of the signature bosses are crenulated and, preferably, are also substantially centrally disposed in cells formed by the intersecting flowing lines. The signature bosses enhance the puffy or filled appearance of the sheet both by creating the illusion of shading as well as by creating actual shading due to displacement of the sheet apparently caused by puckering of surrounding regions due to the embossing or debossing of the signature bosses.

One preferred emboss pattern is made up of a wavy lattice of dot shaped bosses having hearts and flowers within the cells of the lattice. FIG. 7 is a depiction of a preferred emboss pattern for use with the present invention. It is also preferred that the emboss pattern of the present invention be formed, at least in part, of crenulated emboss elements. As previously discussed, a crenulated emboss element is one that has a wide base with smaller separated land areas at the apex, resembling, for example, the top of a castle wall. Such an emboss pattern further enhances the tissue bulk and softness. The emboss elements are preferably less than 100 thousandths of an inch in height, more preferably less than 80 thousandths of an inch, and most preferably 30 to 70 thousandths of an inch.

The basis weight of the single ply tissue is desirably from about 15 to about 25 lbs./3,000 sq. ft. ream, preferably from about 17 to about 20 lbs./ream. The caliper of the tissue of the present invention may be measured using the Model II Electronic Thickness Tester available from the Thwing-Albert Instrument Company of Philadelphia, Pa. The caliper is measured on a sample consisting of a stack of eight sheets of tissue using a two-inch diameter anvil at a 539±10 gram dead weight load. Single-ply tissues of the present invention have a specific (normalized for basis weight) caliper after calendering and embossing of from about 2.6 to 4.2 mils per 8 plies of tissue sheets per pound per ream, the more preferred tissues having a caliper of from about 2.8 to about 4.0, the most preferred tissues have a caliper of from about 3.0 to about 3.8. In the papermaking art, it is known that caliper is dependent on the number of sheets and the size of the roll desired in the final product.

Tensile strength of tissue produced in accordance with the present invention is measured in the machine direction and cross-machine direction on an Instron Model 4000: Series IX tensile tester with the gauge length set to 4 inches. The area of tissue tested is assumed to be 3 inches wide by 4 inches long. In practice, the length of the samples is the distance between lines of perforation in the case of machine direction tensile strength and the width of the samples is the width of the roll in the case of cross-machine direction tensile strength. A 20 pound load cell with heavyweight grips applied to the total width of the sample is employed. The maximum load is recorded for each direction. The results are reported in units of "grams per 3-inch"; a more complete rendering of the units would be "grams per 3-inch by 4-inch strip." The total (sum of machine and cross machine directions) dry tensile of the present invention, when normalized for basis weight, will be between 40 and 75 grams per 3 inches per pound per ream. The ratio of MD to CD tensile is also important and should be between 1.25 and 2.75, preferably between 1.5 and 2.5.

The wet tensile of the tissue of the present invention is measured using a three-inch wide strip of tissue that is folded into a loop, clamped in a special fixture termed a Finch Cup, then immersed in a water. The Finch Cup, which is available from the Thwing-Albert Instrument Company of Philadelphia, Pa., is mounted onto a tensile tester equipped with a 2.0 pound load cell with the flange of the Finch Cup clamped by the tester's lower jaw and the ends of tissue loop clamped into the upper jaw of the tensile tester. The sample is immersed in water that has been adjusted to a pH of 7.0±0.1 and the tensile is tested after a 5 second immersion time. The wet tensile of the present invention will be at least 2.75 grams per three inches per pound per ream in the cross direction as measured using the Finch Cup. Normally, only the cross direction wet tensile is tested, as the strength in this direction is normally lower than that of the machine direction and the tissue is more likely to fail in use in the cross direction.

Softness is a quality that does not lend itself to easy quantification. J. D. Bates, in "Softness Index: Fact or Mirage?" *TAPPI*, Vol. 48 (1965), No. 4, pp. 63A–64A, indicates that the two most important readily quantifiable properties for predicting perceived softness are (a) roughness and (b) what may be referred to as stiffness modulus. Tissue produced according to the present invention has a more pleasing texture as measured by sidedness parameter or reduced values of either or both roughness and stiffness modulus (relative to control samples). Surface roughness can be evaluated by measuring geometric mean deviation in the coefficient of friction (GM MMD) using a Kawabata KES-SE Friction Tester equipped with a fingerprint-type sensing unit using the low sensitivity range. A 25 g stylus weight is used, and the instrument readout is divided by 20 to obtain the mean deviation in the coefficient of friction. The geometric mean deviation in the coefficient of friction or overall surface friction is then the square root of the product of the deviation in the machine direction and the cross-machine direction. The GM MMD of the single-ply product of the current invention is preferably no more than about 0.225, is more preferably less than about 0.215, and is most preferably about 0.150 to about 0.205. The tensile stiffness (also referred to as stiffness modulus) is determined by the procedure for measuring tensile strength described above, except that a sample width of 1 inch is used and the modulus recorded is the geometric mean of the ratio of 50 grams load over percent strain obtained from the load-strain curve. The specific tensile stiffness of said web is preferably from about 0.5 to about 1.2 g/inch/% strain per pound of basis weight and more preferably from about 0.6 to about 1.0 g/inch/% strain per pound of basis weight, most preferably from about 0.7 to about 0.8 g/inch/% strain per pound of basis weight.

To quantify the degree of sidedness of a single-ply tissue, we use a quantity which we term sidedness parameter or S. We define sidedness parameter S as $$S = 1/2\frac{[GM\ MMD]_H}{[GM\ MMD]_L}\{[GM\ MMD]_H + [GM\ MMD]_L\}$$

where $[GM\ MMD]_H$ and $[GM\ MMD]_L$ are the geometric mean friction deviations or overall surface friction of the two sides of the sheet. The "H" and "L" subscripts refer the higher and lower values of the friction deviation of the two sides—that is the larger friction deviation value is always placed in the numerator. For most creped products, the air side friction deviation will be higher than the friction deviation of the Yankee side. S takes into account not only the relative difference between the two sides of the sheet but also the overall friction level. Accordingly, low S values are preferred. The sidedness of the one-ply product should be from about 0.160 to about 0.275; preferably less than about 0.250; and more preferably less than about 0.225.

Formation of tissues of the present invention as represented by Kajaani Formation Index Number should be at least about 50, preferably about 55, more preferably at least about 60, and most preferably at least about 65, as determined by measurement of transmitted light intensity variations over the area of the sheet using a Kajaani Paperlab 1 Formation Analyzer which compares the transmitivity of about 250,000 subregions of the sheet. The Kajaani Formation Index Number, which varies between about 20 and 122, is widely used through the paper industry and is for practical purposes identical to the Robotest Number which is simply an older term for the same measurement.

*TAPPI* 401 OM-88 (Revised 1988) provides a procedure for the identification of the types of fibers present in a sample of paper or paperboard and an estimate of their quantity. Analysis of the amount of the softener/debonder chemicals retained on the tissue paper can be performed by any method accepted in the applicable art. For the most sensitive cases, we prefer to use x-ray photoelectron spectroscopy ESCA to measure nitrogen levels, the amounts in each level being measurable by using the tape pull procedure described above combined with ESCA analysis of each "split." Normally the background level is quite high and the variation between measurements quite high, so use of several replicates in a relatively modern ESCA system such as at the Perkin Elmer Corporation's model 5,600 is required to obtain more precise measurements. The level of cationic nitrogenous softener/debonder such as Quasoft® 202-JR can alternatively be determined by solvent extraction of the Quasoft® 202-JR by an organic solvent followed by liquid chromatography determination of the softener/debonder. *TAPPI* 419 OM-85 provides the qualitative and quantitative methods for measuring total starch content. However, this procedure does not provide for the determination of starches that are cationic, substituted, grafted, or combined with resins. These types of starches can be determined by high pressure liquid chromatography. (*TAPPI* Journal Vol. 76, Number 3.)

The following examples are not to be construed as limiting the invention as described herein.

EXAMPLE 1

One-ply tissue base sheets were made on a pilot paper machine as shown in FIG. 1 from a furnish containing a 2/1 blend of Southern Hardwood Kraft (HWK)/Southern Softwood Kraft (SWK). Six pounds per ton of a cationic temporary wet strength agent (CoBond® 1000) were added to the furnish. Two and one-half pounds per ton of a tertiary-amine-based softener (Quasoft® 218) were applied to the sheets. The strength of the tissue sheets was controlled by wet-end addition of an imidazoline-based softener/debonder. The base sheets were made at different levels of % stretch, with the stretch being changed by changing the % crepe. In this case, the % crepe levels employed were 25% and 20%. The physical properties of the base sheets are shown in Table 1.

TABLE 1

Physical Properties of One-Ply Base Sheets

| Product | Basis Weight (lbs./ream) | Caliper (mils/8 sheets) | Specific Caliper (mils/8 sheets/ lbs./ sheets/ ream) | MD Tensile (grams/ 3 inches) | CD Tensile (grams/ 3 inches) | Specific Total Tensile (grams/ 3 inches/ lbs./ ream) | Tensile Ratio | MD Stretch (%) | Tensile stiffness (grams/ inch/%) | Specific Tensile stiffness (grams/ inch/%/ lbs./ ream) | Friction Deviation |
|---|---|---|---|---|---|---|---|---|---|---|---|
| Lower Stretch | 18.4 | 43.6 | 2.37 | 802 | 508 | 71.2 | 1.58 | 19.1 | 28.0 | 1.52 | 0.170 |
| Higher Stretch | 17.9 | 45.2 | 2.53 | 819 | 534 | 75.6 | 1.53 | 27.2 | 22.5 | 1.26 | 0.173 |

The base sheets were converted to 560-count finished products by embossing them with a spot emboss pattern containing crenulated elements. The emboss pattern was the one shown in FIG. 7. Both base sheets were embossed at an emboss depth of 0.070". The physical properties of the embossed products are shown in Table 2.

TABLE 2

Physical Properties of 560-Count One-Ply Embossed Products

| Product | Basis Weight (lbs./ream) | Caliper (mils/8 sheets) | Specific Caliper (mils/8 sheets/lbs./sheets/ream) | MD Tensile (grams/3 inches) | CD Tensile (grams/3 inches) | Specific Total Tensile (grams/3 inches/lbs./ream) | Tensile Ratio | MD Stretch (%) | Tensile stiffness (grams/inch/%) | Specific Tensile stiffness (grams/inch/%/lbs./ream) | Friction Deviation |
|---|---|---|---|---|---|---|---|---|---|---|---|
| Lower Stretch | 18.3 | 57.0 | 3.11 | 612 | 309 | 50.3 | 1.98 | 15.1 | 18.2 | 0.99 | 0.164 |
| Higher Stretch | 18.2 | 54.5 | 2.99 | 753 | 414 | 64.1 | 18.2 | 22.6 | 17.4 | 0.96 | 0.181 |

By comparing the MD and CD tensile strength of the two products prior to and after embossing, it can be seen that the lower-stretch tissue lost much more strength during the embossing than did the product having the higher level of stretch. The MD and CD tensile loss for the lower-stretch product was 24 and 39% respectively. The loss in MD and CD tensile for the higher-stretch product was only 8 and 22% respectively. It is believed that the higher stretch level allows the tissue sheet to conform more easily to the emboss elements, resulting in less rupturing of fiber-to-fiber bonds during the emboss process. Thus, although the strength of the two base sheets were very similar, the higher-stretch tissue has a finished product strength more than 25% greater than that of the lower-stretch tissue.

The two products were tested for sensory softness by a trained softness panel and found to have equal softness. This test result also demonstrates the superiority of the higher-stretch product, as it is well known that strength and softness are inversely related, and it would be expected that the weaker product would exhibit a higher softness level. Thus, the increased level of % stretch can be used to produce, at a given softness level, a product having superior strength. Alternatively, for a given finished-product strength level, employing a higher % stretch would allow use of a weaker, and thus softer, base sheet, allowing a softer finished product to be made.

EXAMPLE 2

Three one-ply tissue base sheets were produced on a pilot paper machine, as set forth in Example 1, from a furnish containing 50% Northern Softwood Kraft, 50% Northern Hardwood Kraft. Two of the base sheets were made at a targeted basis weight of 19 lbs. per 3,000 square foot ream, the third as a targeted weight of 21 lbs. per 3,000 square foot ream. All three basis sheets were made to the same tensile targets. Where necessary, a cationic potato starch was added to the softwood kraft portion of the furnish to control the sheet strength. All of the base sheets were treated with a sprayed softening compound in the amount of 2.5 lbs. of softener (Quasoft® 218) per ton of fiber. The softener was applied to the Yankee side of the sheet while the sheet was on the felt shown in FIG. 1 from position 53. For one of the sheets made at the targeted basis weight of 19 lbs./ream (Product 1, below), a temporary wet strength agent, glyoxal, was applied to the sheet in the amount of 5 lbs. per ton of fiber. The wet strength agent was applied to the air side of the sheet as shown in FIG. 1 from position 52. The other 19 lbs./ream sheet (Product 2) and the sheet made at the 21 lbs./ream target level (Product 3) were not treated with the temporary wet strength agent. The three base sheets were all produced at 25% crepe and had base sheet MD stretch values of 30.6%, 31.1%, and 30.4% for Products 1, 2, and 3 respectively. All three base sheets were converted to 280 count finished product rolls by embossing the base sheet with a spot emboss pattern which contained crenulated elements. The physical properties of the embossed products are shown in Table 3. As can be seen from the table, the basis weight of all three products was decreased during the converting operation due to the tension applied to the base sheet webs during the embossing and winding process.

TABLE 3

Physical Properties of One-Ply Tissue Products

| Product # | Basis Weight (lbs./ream) | Caliper (mils/8 sheets) | Specific Caliper (mils/8 sheets/lbs./ream) | MD Tensile (grams/3 in) | CD Tensile (grams/3 in) | Specific Total Tensile (grams/3 in/lbs./ream) | Tensile Ratio |
|---|---|---|---|---|---|---|---|
| 1 | 17.54 | 66.5 | 3.79 | 694 | 334 | 58.6 | 2.08 |
| 2 | 17.72 | 70.0 | 3.95 | 662 | 320 | 55.4 | 2.07 |
| 3 | 19.18 | 70.7 | 3.69 | 631 | 332 | 50.2 | 1.90 |

TABLE 3-continued

| Product # | MD Stretch (%) | CD Wet Tensile (grams/ 3 in) | Specific CD Wet Tensile (grams/3 in/lbs./ ream) | Tensile stiffness (grams/in/ %) | Specific Tensile stiffness (grams/in/%/ lbs./ream) | Friction Deviation | Sidedness |
|---|---|---|---|---|---|---|---|
| 1 | 22.8 | 89 | 5.07 | 13.0 | 0.74 | 0.192 | 0.225 |
| 2 | 22.0 | 28 | 1.58 | 13.6 | 0.77 | 0.191 | 0.225 |
| 3 | 21.6 | 22 | 1.15 | 13.4 | 0.70 | 0.192 | 0.225 |

The three products were fielded in Monadic Home Use Tests to determine consumer reaction to the products. Test respondents were asked to rate the products for overall quality and for several attributes as being "Excellent," "Very Good," "Good," "Fair," or "Poor." The results of these ratings were tabulated by assigning numerical values to the responses with values ranging from a 5 for an "Excellent" rating to a 1 for a "Poor" rating. For each of the products a weighted average for the tissue's overall quality and for each of the attributes questioned was calculated. The average scores for overall quality and for several important tissue attributes for the three products are shown in Table 4.

TABLE 4

| Monadic Home Use Test Results | | | | | |
|---|---|---|---|---|---|
| Product # | Overall Rating | Softness Rating | Strength Rating | Thickness Rating | Absorbency Rating |
| 1 | 3.78 | 4.16 | 3.95 | 3.67 | 3.98 |
| 2 | 3.61 | 4.25 | 3.65 | 3.52 | 3.87 |
| 3 | 3.75 | 4.18 | 3.81 | 3.69 | 3.91 |

From the table it can be seen that all three products were rated as being approximately equal in softness, with Product 2 having the highest rating of the three. However, Product 1, the tissue containing the temporary wet strength agent, was rated superior to Product 2, the product with no temporary wet strength agent, for overall performance as well as strength, thickness, and absorbency. Product 1 is also rated as equal to or better than Product 3 for overall quality and for its individual attributes despite the fact that Product 3 has a basis weight advantage of more than 1.5 lbs./ream Thus, the results shown here demonstrate that use of a temporary wet strength agent to impart wet strength to a product can be used to improve the perception of that product, especially in regard to strength related attributes. Alternatively, use of a temporary wet strength agent can allow generation of an equal or superior product at a substantially lower basis weight, resulting in a significant fiber savings.

The foregoing tests and the related other tests set forth in the following examples scribed in the Blumkenship and Green textbook "*State of the Art Marketing Research NTC Publishing Group,*" Lincolnwood, Ill., 1993.

EXAMPLE 3

A one-ply tissue base sheet was produced on a pilot paper machine, as set forth in Example 1, from a furnish containing 50% Southern Softwood Kraft, 50% Southern Hardwood Kraft at a targeted basis weight of 19 lbs. per 3,000 square foot ream. A cationic potato starch was added to the softwood kraft portion of the furnish in the amount of 5.5 lbs. of starch per ton of fiber to control the sheet strength. The base sheet was treated with a sprayed softening compound in the amount of 2.5 lbs. of softener (Quasoft® 218) per ton of fiber. The softener was applied to the Yankee side of the sheet while the sheet was on the felt as shown in FIG. 1 from position 53. A temporary wet strength agent, glyoxal, was applied to the sheet in the amount of 5 lbs. of wet strength agent per ton of fiber. This was applied as shown in FIG. 1 from position 52. The base sheet was made using a crepe percentage of 25% and exhibited a MD stretch value of 27.8%. The base sheet was converted to a 280 count finished product by embossing the base sheet with a spot emboss pattern which contained crenulated elements. This pattern is shown in FIG. 7. The physical properties of the embossed product (designated Product 4) are shown in Table 5.

TABLE 5

| Physical Properties of One-Ply Tissue Products | | | | | | | |
|---|---|---|---|---|---|---|---|
| Product # | Basis Weight (lbs./ ream) | Caliper (mils/8 sheets) | Specific Caliper (mils/8 sheets/lbs./ ream) | MD Tensile (grams/ 3 in) | CD Tensile (grams/3 in) | Specific Total Tensile (grams/3 in/lbs./ ream) | Tensile Ratio |
| 4 | 18.28 | 70.7 | 3.86 | 578 | 346 | 53.5 | 1.67 |

TABLE 5-continued

| Product # | MD Stretch (%) | CD Wet Tensile (grams/ 3 in) | Specific CD Wet Tensile (grams/3 in/lbs./ ream) | Tensile stiffness (grams/in/ %) | Specific Tensile stiffness (grams/in/%/ lbs./ream) | Friction Deviation | Sidedness |
|---|---|---|---|---|---|---|---|
| 4 | 18.3 | 96 | 5.25 | 14.1 | 0.77 | 0.200 | 0.227 |

The embossed product was fielded in a Monadic Home Use Test. It was expected that this product would be rated by consumers as being less preferred than the products described in the previous example since Product 4 was made using Southern hardwoods and softwoods which were substantially coarser than the Northern fibers used to make Products 1, 2, and 3. Typical coarseness values for the fibers used in the four products are shown in Table 6.

TABLE 6

Typical Coarseness Values for Fiber Furnish Used in Examples 2 and 3

| Fiber | Coarseness (milligrams/ 100 meters) |
|---|---|
| Northern Softwood Kraft (Products 1, 2, and 3) | 18.9 |
| Northern Hardwood Kraft (Products 1, 2, and 3) | 9.9 |
| Southern Softwood Kraft (Product 4) | 30.5 |
| Southern Hardwood Kraft (Product 4) | 14.3 |

It is well known that the use of a coarser fiber furnish generally results in a product having lower softness. However, the results of the Monadic Home Use Test, listed in Table 7, showed that the tissue product made using the Southern furnish was regarded by the panel as essentially equal to those made using the Northern fibers with respect to overall quality and for the other important tissue properties.

TABLE 7

Monadic Home Use Test Results

| Product # | Overall Rating | Softness Rating | Strength Rating | Thickness Rating | Absorbency Rating |
|---|---|---|---|---|---|
| 4 | 3.77 | 4.11 | 3.85 | 3.71 | 3.84 |

The base sheets that were used to make Products 1 and 4 were also converted using the same emboss pattern as shown in FIG. 7 to finished product rolls having 500 sheets each. These products were also tested in Monadic Home Use Tests. The physical properties of the two products and results from the Monadic Home Use Tests are shown in Tables 8 and 9 respectively. In these tables Product 5 refers to the 500-count tissue product made from the same base sheet as that used to make Product 1, while Product 6 refers to the 500-count product made from the same base sheet that was used for Product 4.

TABLE 8

Physical Properties of 500 Count One-Ply Tissue Products

| Product # | Basis Weight (lbs./ ream) | Caliper (mils/8 sheets) | Specific Caliper (mils/8 sheets/lbs./ ream) | MD Tensile (grams/ 3 in) | CD Tensile (grams/3 in) | Specific Total Tensile (grams/3 in/lbs./ ream) | Tensile Ratio |
|---|---|---|---|---|---|---|---|
| 5 | 18.11 | 67.0 | 3.70 | 740 | 341 | 59.7 | 2.17 |
| 6 | 18.16 | 63.6 | 3.50 | 598 | 357 | 52.6 | 1.68 |

TABLE 8-continued

| Product # | MD Stretch (%) | CD Wet Tensile (grams/3 in) | Specific CD Wet Tensile (grams/3 in/lbs./ream) | Tensile stiffness (grams/in/%) | Specific Tensile stiffness (grams/in/%/lbs./ream) | Friction Deviation | Sidedness |
|---|---|---|---|---|---|---|---|
| 5 | 23.8 | 96 | 5.30 | 12.6 | 0.70 | 0.201 | 0.234 |
| 6 | 19.7 | 96 | 5.29 | 15.8 | 0.87 | 0.196 | 0.221 |

TABLE 9

Monadic Home Use Test Results

| Product # | Overall Rating | Softness Rating | Strength Rating | Thickness Rating | Absorbency Rating |
|---|---|---|---|---|---|
| 5 | 3.89 | 4.16 | 4.06 | 3.87 | 4.12 |
| 6 | 4.03 | 4.43 | 4.18 | 4.18 | 4.24 |

The results of the Monadic Home Use Tests show that for perceived overall quality and performance in several important tissue attributes, including softness, the product made using the coarser Southern furnish is at least equivalent or superior to the product made using the less coarse Northern furnish. This result indicates that equivalently soft products of the current invention can be made using fibers having a wide range of coarseness values.

EXAMPLE 4

The European Pat. No. Application 95302013.8 describes a soft, single-ply tissue that has low sidedness. That product employs such strategies as fiber and/or chemical stratification, aggressive creping, a low creping angle and embossing the product's attributes. The novel tissues disclosed herein have properties superior to those of the aforementioned references and have properties which are similar to two-ply tissue or TAD produced tissue. For example, the tissue of the current invention has a relatively high level of temporary wet strength that is absent in the tissue of the prior art. Also, use of the current invention allows the production of premium CWP one-ply tissues without the use of fiber stratification. It is, of course, understood that fiber stratification could be used to create even better products; however, such a practice has been found to be unnecessary to achieve products that match the performance of the best commercial two-ply CWP and one-ply TAD tissue products.

Figure 3:
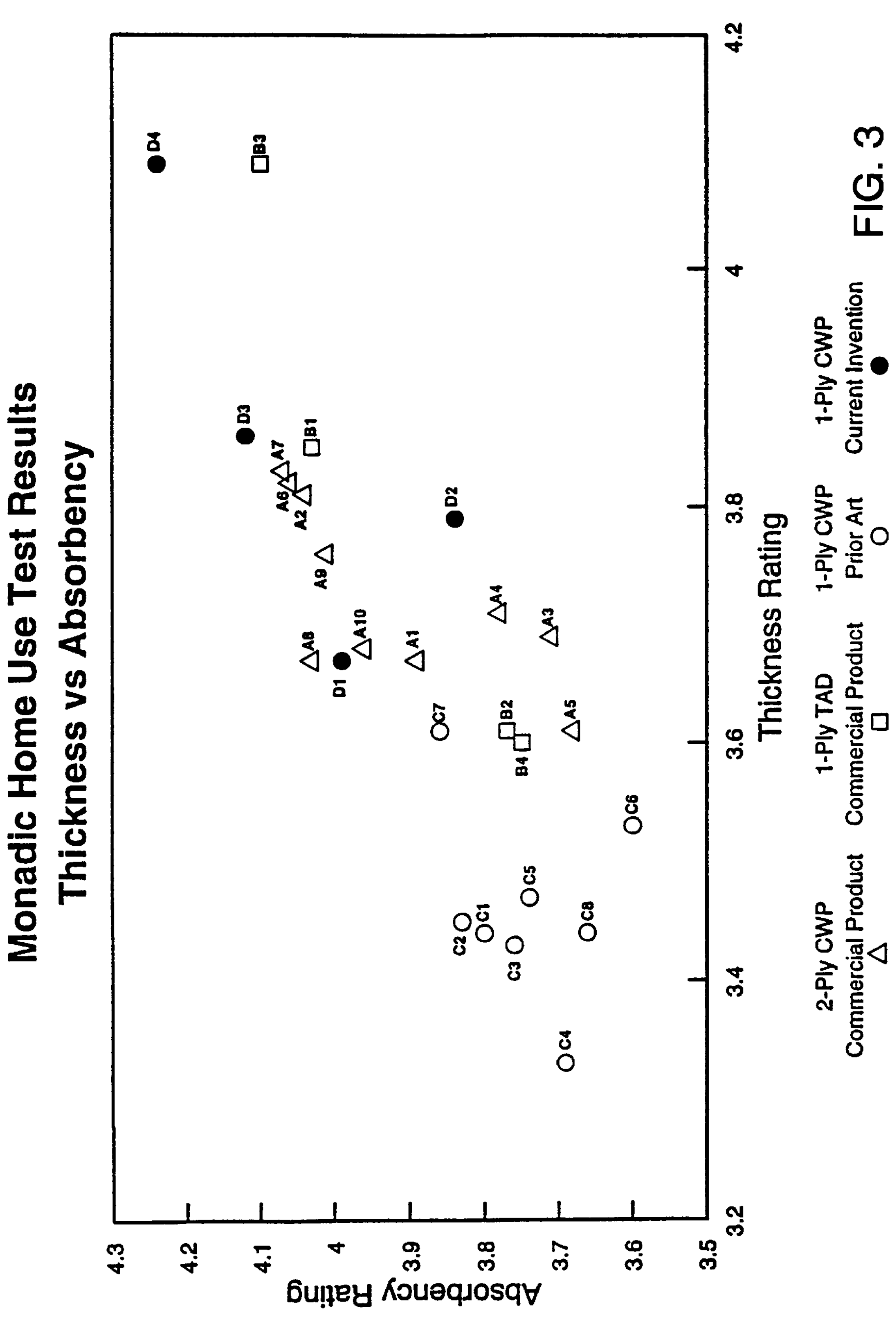
FIG. 3 illustrates the high thickness and absorbency consumer rating achieved by the one-ply tissue of this invention.
Figure 4:
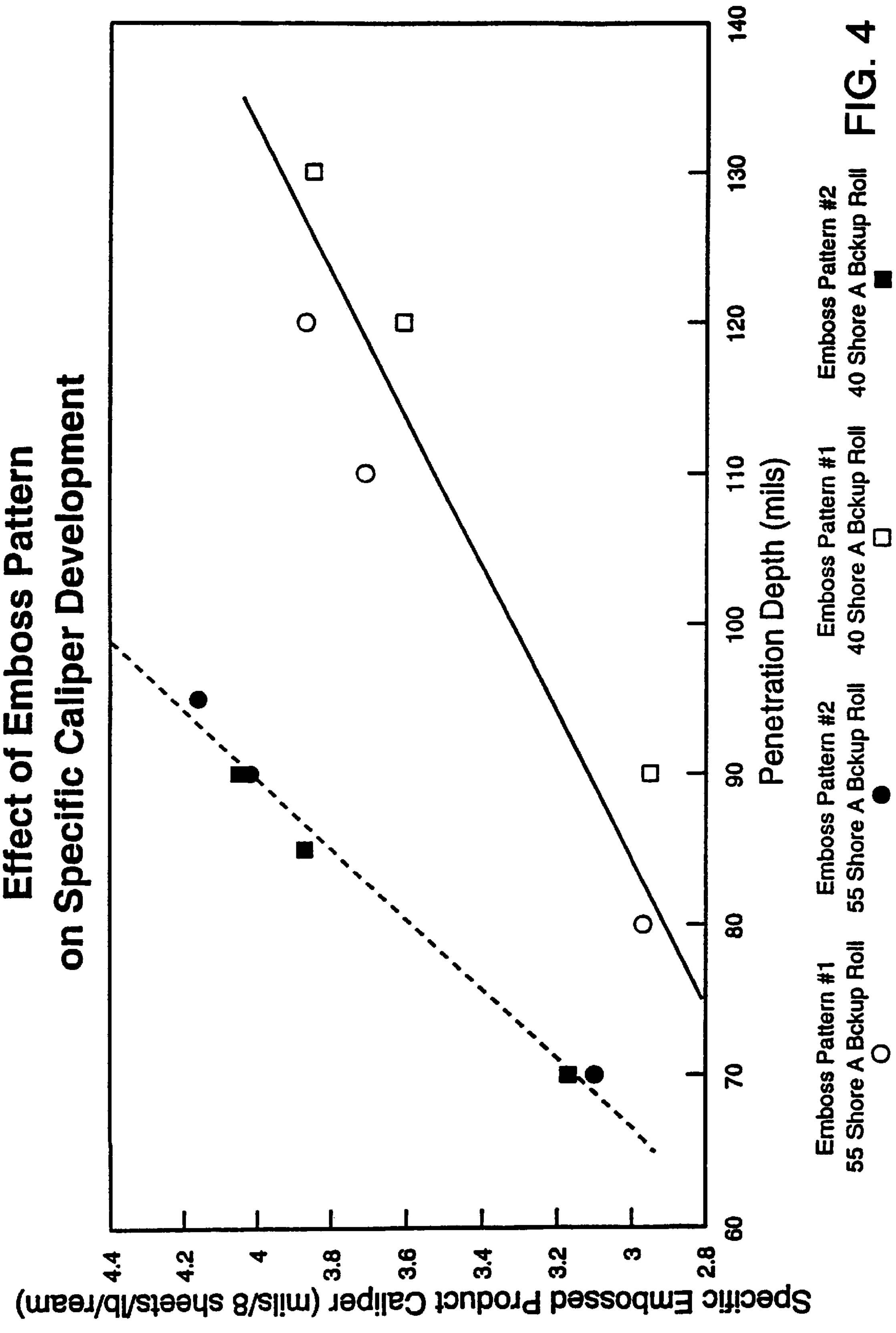
FIG. 4 illustrates the effect of emboss pattern on specific caliper development.

The improvement of the current invention over the prior art can be seen in FIGS. 3 and 4 which plot the results of Monadic Home Use Tests for products using both technologies. As references, the values achieved in Monadic Home Use Tests for several commercially available tissue products are also shown. From the figures, it can be seen that the performance of the products of the current invention dearly out perform those of the prior art and are equal to most current commercial offerings. The results of Monadic Home Use Test scores are set forth in the FIGS. 3 and 4 and the products are tabulated in Table 10.

TABLE 10

Monadic Home Use Test Product Descriptions

| Product | Manufacturing Process | Number of Plies | Sheet Count | Comments |
|---|---|---|---|---|
| A1 | CWP | 2 | 280 | Commercial Product |
| A2 | CWP | 2 | 280 | Commercial Product |
| A3 | CWP | 2 | 280 | Commercial Product |
| A4 | CWP | 2 | 280 | Commercial Product |
| A5 | CWP | 2 | 280 | Commercial Product |
| A6 | CWP | 2 | 250 | Commercial Product |
| A7 | CWP | 2 | 250 | Commercial Product |
| A8 | CWP | 2 | 500 | Commercial Product |
| A9 | CWP | 2 | 450 | Commercial Product |
| A10 | CWP | 2 | 450 | Commercial Product |
| B1 | TAD | 1 | 280 | Commercial Product |
| B2 | TAD | 1 | 280 | Commercial Product |
| B3 | TAD | 1 | 560 | Commercial Product |
| B4 | TAD | 1 | 560 | Commercial Product |
| C1 | CWP | 1 | 280 | Prior Art |
| C2 | CWP | 1 | 280 | Prior Art |
| C3 | CWP | 1 | 280 | Prior Art |
| C4 | CWP | 1 | 280 | Prior Art |
| C5 | CWP | 1 | 280 | Prior Art |
| C6 | CWP | 1 | 500 | Prior Art |
| C7 | CWP | 1 | 500 | Prior Art |
| C8 | CWP | 1 | 500 | Prior Art |
| D1 | CWP | 1 | 280 | Current Invention |
| D2 | CWP | 1 | 280 | Current Invention |
| D3 | CWP | 1 | 500 | Current Invention |
| D4 | CWP | 1 | 500 | Current Invention |

EXAMPLE 5

Figure 6:
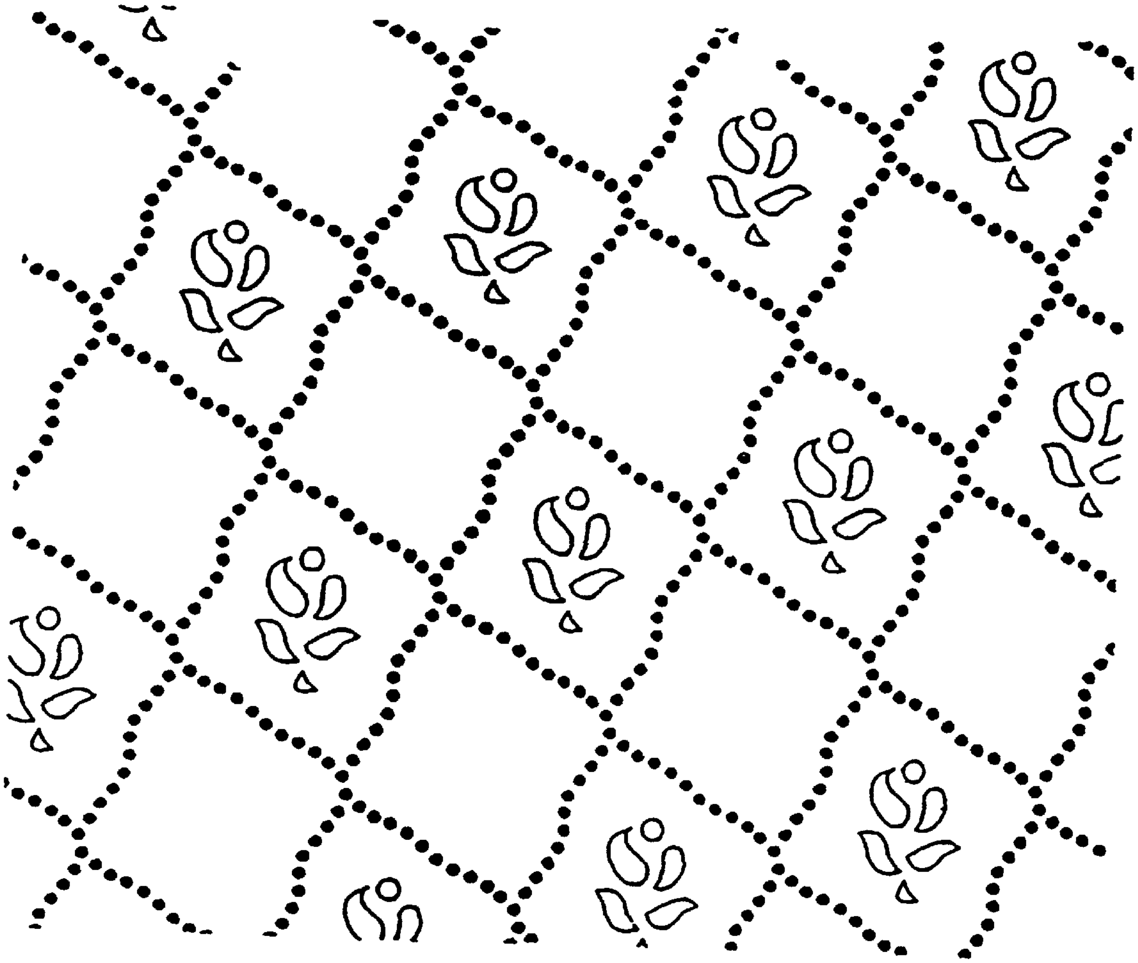
FIG. 6 illustrates a useful emboss pattern.

As a further test of the technologies used in the current invention to deliver high-performance products, two one-ply tissue products were tested against commercial two-ply products in Paired Home Use Tests. In these tests, a consumer is asked to use both products sequentially and then to state a preference between the two products for overall performance and for each of several individual attributes. The first of these one-ply tissue products was produced from the same base sheet as was used to make Product 1 in Example 2. This tissue, designated Product 7, was compared with a commercial product that, like Product 7, employed Northern hardwoods and softwoods in its furnish. The other one-ply product, Product 8, was made from the same base sheet as was Product 4 in Example 3. This tissue product was compared to a commercial product whose furnish contained Southern hardwood and softwood fibers, as did Product 8. Both of the one-ply products were embossed using the emboss pattern shown in FIG. 7, while the two commercial products were embossed with the emboss pattern shown in FIG. 6. The physical properties of the four products, all of which had a sheet count of 280, are shown in Table 11.

factors, which was demonstrated in Example 2, is believed to be the more important. However, the use of emboss patterns containing crenulated elements does impart an additional benefit to the product with regard to thickness perception and constitutes a preferred embodiment of the invention.

TABLE 11

Physical Properties of Tissue Product Tested in Paired Comparison Test

| Product | Basis Weight (lbs./ream) | Caliper (mils/8 sheets) | Specific Caliper (mils/8 sheets/lbs./ream) | MD Tensile (grams/3 in) | CD Tensile (grams/3 in) | Specific Total Tensile (grams/3 in/lbs./ream) | Tensile Ratio |
|---|---|---|---|---|---|---|---|
| Commercial 2-Ply - Northern Furnish | 19.29 | 68.4 | 3.54 | 1139 | 418 | 80.2 | 2.72 |
| One Ply - Northern Furnish (Product 7) | 17.54 | 66.5 | 3.79 | 694 | 334 | 58.6 | 2.08 |
| Commercial 2-Ply - Southern Furnish | 18.51 | 64.6 | 3.49 | 1025 | 334 | 73.4 | 3.07 |
| One-Ply - Southern Furnish (Product 8) | 18.18 | 69.2 | 3.81 | 562 | 349 | 50.1 | 1.61 |

| Product | MD Stretch (%) | CD Wet Tensile (grams/3 in) | Specific CD Wet Tensile (grams/3 in/lbs./ream) | Tensile stiffness (grams/in/%) | Specific Tensile stiffness (grams/in/%/lbs./ream) | Friction Deviation | Sidedness |
|---|---|---|---|---|---|---|---|
| Commercial 2-Ply - Northern Furnish | 16.3 | — | — | 18.4 | 0.95 | 0.176 | 0.204 |
| One Ply - Northern Furnish (Product 7) | 22.3 | 96 | 5.47 | 10.9 | 0.62 | 0.186 | 0.204 |
| Commercial 2-Ply - Southern Furnish | 12.2 | — | — | 20.2 | 1.09 | 0.170 | 0.204 |
| One Ply - Southern Furnish (Product 8) | 17.6 | 96 | 5.28 | 14.5 | 0.80 | 0.192 | 0.218 |

The results of the paired comparison tests are shown in Tables 11 and 12 for the products made using the Northern and Southern furnishes, respectively. The values recorded in the tables are the number of consumers (out of 100) that preferred the particular product for the specified attribute. The number of consumers had an equal preference for both products is also recorded. As can be seen from the tables, the one-ply products performed equal to or better than the two-ply commercial products for all attributes tested. These results indicate that the combination of low dry tensile strength, adequate temporary wet strength, high crepe ratio, use of chemical softeners, and embossing using a pattern containing crenulated elements has resulted in a one-ply product equal or superior to a two-ply tissue.

EXAMPLE 6

As was demonstrated in Example 4, one of the improvements of the current product over that of the prior art was for the attribute of thickness perception. It is believed that the two factors that allow the present invention to achieve this improvement over the prior art are the inclusion of a temporary wet strength agent and the use of an emboss pattern that contains crenulated elements. The first of these

TABLE 12

Results of Paired Consumer Test - Northern Furnish Product

| Attribute | No. Preferring One-Ply Product | No. Preferring Two Ply Product | No. Having No Preference |
|---|---|---|---|
| Overall Performance | 52 | 32 | 16 |
| Softness | 46 | 27 | 27 |
| Strong/Doesn't Fall Apart | 36 | 33 | 31 |
| Absorbency | 39 | 30 | 31 |
| Product Seems More Quilted | 59 | 19 | 22 |
| Layers Separate Less | 38 | 24 | 38 |
| Cleansing Ability | 35 | 30 | 35 |
| More Comfortable to Use | 46 | 26 | 28 |
| Feels Thick/Substantial | 50 | 30 | 20 |
| Tears More Evenly | 32 | 24 | 44 |
| Sheet Has Attractive Appearance | 43 | 18 | 39 |

TABLE 13

Results of Paired Consumer Test - Southern Furnish Product

| Attribute | No. Preferring One-Ply Product | No. Preferring Two Ply Product | No. Having No Preference |
|---|---|---|---|
| Overall Performance | 53 | 36 | 11 |
| Softness | 45 | 38 | 17 |
| Strong/Doesn't Fall Apart | 40 | 27 | 33 |
| Absorbency | 34 | 26 | 40 |
| Product Seems More Quilted | 48 | 36 | 16 |
| Layers Separate Less | 37 | 21 | 42 |
| Cleansing Ability | 32 | 21 | 47 |
| More Comfortable to Use | 41 | 37 | 22 |
| Feels Thick/Substantial | 43 | 38 | 19 |
| Tears More Evenly | 41 | 18 | 41 |
| Sheet Has Attractive Appearance | 42 | 19 | 39 |

Figure 5:
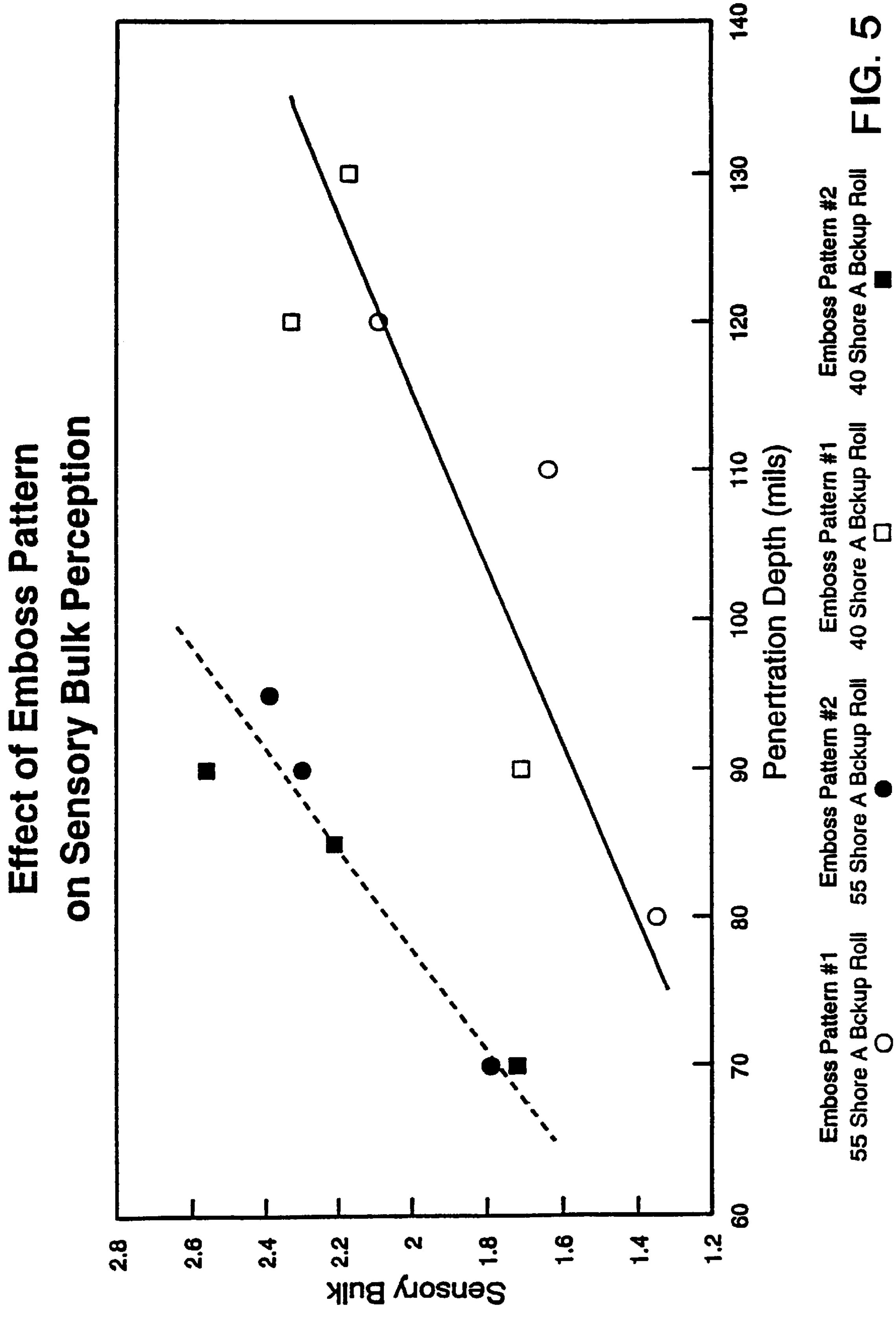
FIG. 5 illustrates the effect of emboss pattern on sensory bulk thickness perception.

The advantage of embossing using a pattern that contains crenulated elements is shown in FIGS. 4 and 5 which plot the specific embossed caliper and sensory bulk, respectively of a one-ply tissue product that was embossed using two emboss patterns. The first of these patterns (designated Pattern #1), shown in FIG. 6, does not contain any crenulated elements, while the second pattern, shown in FIG. 7, (Pattern #2) includes crenulated elements in the pattern. In both FIG. 4 and FIG. 5, the specific caliper or bulk data are plotted as a function of emboss depth. As can be seen from the figures, use of the crenulated element pattern allows the generation of a higher caliper or sensory bulk value at a given level of penetration. Thus, using an emboss pattern containing crenulated elements allows one-ply products having improved caliper or bulk to be generated at a lower level of emboss. Lower level of embossing tends to result in less strength loss in the tissue and less wear of the rubber backup roll in the emboss nip.

EXAMPLE 7

One-ply base sheets were made from a furnish containing a 2/1 blend of Southern HWK/Southern SWK. The base sheets were treated with 3 lbs/ton of softener which was added to the stock prior to its being formed into a paper web. For one of the base sheets, the softener used was a dialkyl dimethyl quaternary amine, for the other a cyclic imidazoline quaternary amine. Both base sheets were sprayed with 2.5 lbs/ton of a linear amine amide softener, which was applied from position 53 as shown in FIG. 1, and 12 lbs/ton of a non-cationically charged wet strength agent, which was sprayed onto the sheet from position 52 as shown in FIG. 1. Refining of the entire furnish was used to control the base sheet strength to the targeted level. Both base sheets were converted to 560-count finished products using the emboss pattern shown in FIG. 7. The sheets were embossed at a depth of 0.065 inches. The physical properties of the converted products are shown in Table 14.

TABLE 14

Physical Properties of One-Ply Tissue Products

| Softener Used | Basis Weight (lbs./ream) | Caliper (mils/8 sheets) | Specific Caliper (mils/8 sheets/lbs./ream) | MD Tensile (grams/3 in) | CD Tensile (grams/3 in) | Specific Total Tensile (grams/3 in/lbs./ream) | Tensile Ratio |
|---|---|---|---|---|---|---|---|
| Dialkyl Dimethyl Quaternary | 18.69 | 54.2 | 2.90 | 627 | 322 | 50.8 | 1.95 |
| Imidazoline Quaternary | 18.62 | 58.2 | 3.13 | 590 | 290 | 41.3 | 2.03 |

| Product | Md Stretch (%) | CD Wet Tensile (grams/3 in) | Specific CD Wet Tensile (grams/3 in/lbs./ream) | Tensile stiffness (grams/in/%) | Specific Tensile stiffness (grams/in/%/lbs./ream) | Friction Deviation | Sidedness |
|---|---|---|---|---|---|---|---|
| Dialkyl Dimethyl Quaternary | 17.4 | 56 | 3.01 | 18.6 | 1.00 | 0.175 | 0.180 |
| Imidazoline Quaternary | 16.2 | 54 | 2.90 | 17.0 | 0.91 | 0.177 | 0.197 |

The two products were tested for sensory softness by a trained softness panel. The product containing the imidazoline-based softener was judged to be softer than the tissue made using the dialkyl dimethyl softener. The difference in softness was statistically significant at the 95% confidence level, showing that use of the imidazoline softener resulted in a superior product. Use of this class of softeners constitutes a preferred embodiment of the present invention.

EXAMPLE 8

An aqueous dispersion of softener was made by mixing appropriate amount with deionized water at room temperature. Mixing was accomplished by using a magnetic stirrer operated at moderate speeds for a period of one minute. The composition of softener dispersion is shown in Table 15 below.

TABLE 15

| Composition | Weight (%) |
|---|---|
| Imidazoline | 67.00 |
| TMPD (2,2,4 trimethyl 1,3 pentane diol) | 9.24 |
| TMPD-1EO (ethoxylated TMPD) | 14.19 |
| TMPD-2EO (ethoxylated TMPD) | 6.60 |
| TMPD-3EO (ethoxylated TMPD) | 1.32 |
| TMPD-4EO (ethoxylated TMPD) | 0.66 |
| Other | 0.99 |

Depending on the concentration of softener in water, the viscosity can range from 20 to 800 cp. at room temperature. A unique feature of this dispersion is its stability under high ultracentrifugation. An ultracentrifuge is a very high speed centrifuge in which the centrifugal force of rotation is substituted for the force of gravity. By whirling colloidal dispersions in cells placed in specially designed rotors, accelerations as high as one million times that of gravity can be achieved. When this dispersion was subjected to ultracentrifugation for 8 minutes at 7000 rpm, no separation of the dispersion occurred. The distribution of the particle size of softener in the dispersion as measured by the Nicomp Submicron particle size analyzer is presented in Table 16:

TABLE 16

| Weight % | Particle Size (nanometers) |
|---|---|
| 12 | 162 |
| 88 | 685 |

EXAMPLE 9

Tissue treated with softener made in Example 8 was produced on a pilot paper machine. The pilot papermachine is a crescent former operated in the waterformed mode. The furnish was either a 2/1 blend of Northern HWK and Southern SWK or a 2/1 blend of Northern HWK and Northern SWK. A predetermined amount (10 lbs./ton) of a cationic wet strength additive (Cobond 1600), supplied by National Starch and Chemical Co., was added to the furnish.

An aqueous dispersion of the softener was added to the furnish containing the cationic wet strength additive at the fan pump as it was being transported through a single conduit to the headbox. The stock comprising of the furnish, the cationic wet strength additive, and the softener was delivered to the forming fabric to form a nascent/embryonic web. The sheet was additionally sprayed with Quasoft 202JR softener while on the felt. Dewatering of the nascent web occurred via conventional wet pressing process and drying on a Yankee dryer. Adhesion and release of the web from the Yankee dryer was aided by the addition of adhesive (Betz 97/5 Betz 75 at 2.5 lbs./ton) and release agents (Houghton 8302 at 0.07 lbs./ton), respectively. Yankee dryer temperature was approximately 190° C. The web was creped from the Yankee dryer with a square blade at an angle of 75 degrees. The basesheets were converted to 560 count products by embossing them with a spot embossing pattern containing crenulated elements at emboss penetration depth of 0.070". The softened tissue paper product has a basis weight of 18–19 lbs./ream, MD stretch of 18–29 %, approximately 0.05 to 0.8 % of softener by weight of dry paper, a CD dry tensile greater than 180 grams/3 inches and a CD wet tensile greater than 50 grams/3".

EXAMPLE 10

Tissue papers containing different levels of softener was made according to the method set forth in Example 9. The properties of the softened tissue papers are shown in Table 17.

TABLE 17

| Softener Level (lbs./ton) | Furnish | Basis Weight (lbs./rm.) | Total Tensile (g/3') | GM Modulus (g % Strain) | Surface Friction (GMMMD) | Sensory Softness* |
|---|---|---|---|---|---|---|
| 1 | 2/1 NHWK/SSWK | 18.4 | 968 | 12.9 | .169 | 17.03 |
| 3 | 2/1 NHWK/NSWK | 8.6 | 1034 | 14.1 | .189 | 17.88 |
| 3 | 2/1 NHWK/NSWK | 19.67 | 1000 | 12.6 | .185 | 19.12 |

*A difference of 0.4 sensory softness units is significant at 95% level of significance.

EXAMPLE 11

Tissue paper was made on a commercial paper machine, a suction breast roll former operated in the waterformed mode. The furnish was comprised of 60% Southern HWK and 30% secondary fiber and 10% Northern SWK. A predetermined amount (10#/ton) of a cationic wet strength additive (Cobond 1600), supplied by National Starch and Chemical Co., was added to the furnish.

An aqueous dispersion of the softener was added to the furnish containing the cationic wet strength additive, at the fan pump, as it was being transported through a single conduit to the headbox. The stock comprising of the furnish, the cationic wet strength additive and the softener was delivered to the forming fabric to form a nascent/embryonic web. The sheet was additionally sprayed with Quasoft 202JR softener while on the felt. Dewatering of the nascent web occurred via conventional wet pressing process and drying on a Yankee dryer. Adhesion and release of the web from the Yankee dryer was aided by the addition of the adhesive and release agents at 2 and at 0.07 lbs./ton), respectively. Yankee dryer temperature was approximately 190° C. The web was creped from the Yankee dryer with a square blade at an angle of 78 degrees. The basesheets were converted to 560 count products by embossing them with a spot embossing pattern containing crenulated elements. The softened tissue paper product has a basis weight of 18–19 lbs./ream, MD stretch of 19–29%, approximately 0.05 to 0.8% of softener by weight of dry paper, a CD dry tensile greater than 180 grams/3 inches and a CD wet tensile greater than 50 grams/3". The softened tissue has a sensory softness greater than 16.4.

Other embodiments of the invention will be apparent to those skilled in the art from consideration of the specification and practice of the invention disclosed herein. It is intended that the specification and examples be considered as exemplary only with the true scope and spirit of the invention being indicated by the following claims.

What is claimed is:

1. A soft, embossed, single-ply tissue product having a basis weight of at least 15 lbs./3,000 sq. ft. ream and having low sidedness, said single-ply tissue formed by wet pressing of a cellulosic web, adhering said web to a Yankee dryer and creping the web from the Yankee dryer, said single-ply tissue including (a) a wet strength agent comprising an organic moiety, and (b) nitrogenous softener agent, the amount of wet strength agent, and the nitrogenous softener added being sufficient to produce a single-ply tissue having a specific total tensile strength of between 40 and 75 grams per 3 inches per pound per 3000 square foot ream, a cross direction specific wet tensile strength of between 2.75 and 7.5 grams per 3 inches per pound per 3000 square foot ream, the ratio of machine direction tensile to cross direction tensile of between 1.25 and 2.75, a specific geometric mean tensile stiffness of between 0.5 and 1.2 grams per inch per percent strain per pound per 3000 square feet ream, a friction deviation of less than 0.225, and a sidedness parameter of less than 0.275.

2. The tissue of claim 1 wherein the nitrogenous softener agent is a cationic nitrogenous softener agent.

3. The tissue of claim 1 wherein the temporary wet strength agent is selected from the group of uncharged organic compounds having aldehydic units and water soluble organic polymers comprising aldehydic units and cationic units.

4. The tissue of claim 2 or claim 3 having a plurality of bosses formed therein comprising a plurality of bosses arrayed to form polygonal cells making up a lattice structure; and a plurality of bosses forming a first signature emboss pattern being centrally arrayed within a plurality of cells, said first signature bosses being formed of linear continuous embossments at a height exceeding 3 thousandths of an inch and a height less than 120 thousandths of an inch;

a plurality of bosses forming a second signature emboss pattern being centrally arrayed within a plurality of cells, said second signature bosses being formed of linear crenulated embossments at a height less than a 120 thousandths of an inch and defining a plurality of merlons and crenulated embossments wherein said crenulated embossments extend to a depth of at least 2 thousandths of an inch.

5. The tissue according to claim 4 wherein combination of lattice structure and signature bosses are offset from the machine direction.

6. The tissue according to claim 5 wherein combination is offset from about 15 to 65 degrees from the machine direction.

7. The tissue according to claim 4 wherein the continuous signature bosses have a height of about 40 to 80 thousandths of an inch and the crenulated signature bosses have a height of about 40 to 80 thousandths of an inch.

8. The tissue according to claim 4 wherein the stitch-shaped bosses have a height of about 40 to 80 thousandths of an inch.

9. The tissue according to claim 4 wherein the diameter of the stitch-shaped boss is at least one and one-half times the width of a line of the continuous or crenulated signature boss.

10. The tissue according to claim 4 wherein the diameter of the stitch-shaped boss is at least twice the width of the continuous or crenulated signature boss.

11. The tissue according to claim 4 wherein the diameter of the stitch-shaped boss is at least three times the width of a line of the continuous or crenulated signature boss.

12. The tissue according to claim 4 wherein said polygonal cells are diamond shaped cells.

13. The tissue according to claim 4 wherein said tissue is approximately 3 polygonal cells wide.

14. The tissue according to claim 4 wherein the polygonal cells have generator lines which connect the apices of the polygonal cells and wherein the center of the stitch-shaped boss farthest from the generator line is a distance equivalent to at least 1 diameter of said stitch-shaped boss but no more than 3 diameters of said stitch-shaped boss from said line.

15. The tissue according to claim 4 wherein the stitch-shaped bosses are substantially circular dots.

16. The tissue according to claim 4 wherein the stitch-shaped bosses resemble dashes.

17. The tissue according to claim 16 wherein the dashes have an aspect ratio of less than 5.

18. The tissue according to claim 14 wherein the polygonal cells are hexagonal cells.

19. The tissue according to claim 4 wherein the polygonal cells are octagonal cells.

20. The tissue according to claim 4 wherein the crenulated signature bosses are configured as two concentrically arranged hearts.

21. The tissue of claim 2 wherein the cationic nitrogenous softener has an imidazoline moiety and said softener has a melting point of about 0°–40° C. in a hydrocarbon selected from the group consisting of aliphatic polyols, aliphatic diols, alkoxylated aliphatic polyols, alkoxylated aliphatic diols, and mixtures of these compounds.

22. The tissue of claim 21 wherein the imidazoline moiety in a hydrocarbon selected from the group of aliphatic polyols, aliphatic diols, alkoxylated aliphatic polyols, alkoxylated aliphatic diols, and mixtures of these is dispersible in water at a temperature of about 1° C. to about 40° C.

23. The tissue of claim 2 wherein the imidazoline moiety is of the following formula:

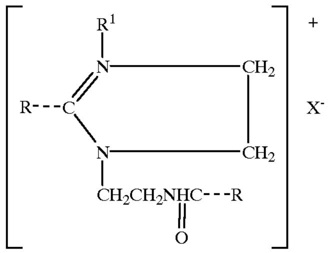

wherein X is an anion and R is selected from the group of saturated and unsaturated paraffinic moieties having a carbon chain of $C_{12}$ to $C_{20}$ and $R^1$ is selected from the groups of methyl and ethyl moieties.

24. The tissue of claim 23 wherein X is methyl sulfate.

25. The tissue of claim 23 wherein X is chloride ion.

26. The tissue of claim 23 wherein R has a chain length of $C_{12}$ to $C_{18}$.

27. The tissue of claim 23 wherein R has a chain length of $C_{18}$.

28. The tissue of claim 21 wherein the diol is 2,2,4 trimethyl 1,3 pentane diol.

29. The tissue of claim 21 wherein alkoxylated diol is ethoxylated 2,2,4 trimethyl 1,3 pentane diol.

* * * * *